(12) United States Patent
Boertjes

(10) Patent No.: US 6,618,193 B1
(45) Date of Patent: *Sep. 9, 2003

(54) OPTICAL AMPLIFICATION SYSTEMS AND METHODS

(75) Inventor: David W. Boertjes, Nepean (CA)

(73) Assignee: Nortel Networks Limited, St. Laurent (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/816,464

(22) Filed: Mar. 26, 2001

(51) Int. Cl.[7] .............................................. H04B 10/12
(52) U.S. Cl. ................. 359/337.2; 359/337.4; 359/337
(58) Field of Search ................ 339/337.4, 337.2; 359/337.4, 337.2, 337.21, 337.22, 337

(56) References Cited

U.S. PATENT DOCUMENTS

| | | | | |
|---|---|---|---|---|
| 6,049,417 A | * | 4/2000 | Srivastava et al. | 359/337.4 |
| 6,049,418 A | * | 4/2000 | Srivastava et al. | 359/337.4 |
| 6,084,704 A | | 7/2000 | Button et al. | |
| 6,141,142 A | * | 10/2000 | Espindola et al. | 359/124 |
| 6,252,700 B1 | * | 6/2001 | Hwang et al. | 359/337 |
| 6,304,370 B1 | * | 10/2001 | Barnard | 359/341.1 |
| 6,307,668 B1 | * | 10/2001 | Bastien et al. | 359/337.1 |
| 6,310,716 B1 | * | 10/2001 | Evans et al. | 359/124 |
| 6,359,727 B1 | * | 3/2002 | Nakazato | 359/337.4 |
| 6,421,172 B1 | * | 7/2002 | Flood et al. | 359/341 |
| 2001/0033411 A1 | * | 10/2001 | Shiota et al. | 359/333 |

OTHER PUBLICATIONS

Zuffada et al. IEEE Transactions on Antennas and Propagation, vol. 46, No. 5, May 1998.*
Chung et al. CLEO, Pacific Rim '99. CUg. 30–Sep. 3, 1999, vol. 3.*
Sakamoto et al. Elect. Letts. Feb. 19, 1998, vol. 34, No. 4.*
Yamada et al. Elec. Letts. Apr. 10, 1997, vol. 33 No. 8.*
Kopf et al. IEEE Transactions on Dielectrics and Electrical Insulation, vol. 2, No. 6, Dec. 5, 1995.*

* cited by examiner

*Primary Examiner*—Thomas G. Black
*Assistant Examiner*—Stephen Cunningham

(57) ABSTRACT

Optical amplification systems and methods are disclosed. A first optical amplification system includes an optical interface filter configured to separate a desired communications band from at least one other communications band, and an optical amplifier in communication with the interface filter for amplifying the desired communications band. The optical amplifier includes at least one suppression filter configured to attenuate a wavelength subset of the at least one other communications band nearest the desired communications band and narrower than the at least one other communications band.

24 Claims, 6 Drawing Sheets

OPTICAL AMPLIFICATION SYSTEMS AND METHODS

FIELD OF THE INVENTION

The present invention relates to optical communications, and more particularly to optical amplification systems and methods.

BACKGROUND OF THE INVENTION

In fiber optic transmission systems, optical communications signals are typically transmitted in two or more discrete communications bands on a common optical fiber. Each of the communications bands consists of optical signals in a particular corresponding wavelength range, and includes a plurality of closely spaced channels at successive wavelength intervals within the wavelength range of the band. Due to the long transmission distances that the optical signals typically travel through the optical fiber medium, it is often necessary to amplify the optical signals during the course of their transmission, to compensate for signal strength losses occurring in the fiber.

A typical optical amplifier, such as an erbium-doped fiber amplifier for example, is generally able to amplify only a limited bandwidth range, such as one communications band for example, and is generally not capable of simultaneously amplifying all of the communications bands. Accordingly, one approach to optical signal amplification involves the use of interface filters to separate the communications bands. Each communications band is then directed through a separate respective optical amplifier, having input and output power specifications corresponding to the expected signal strength loss and required signal strength output for that particular communications band. The amplified communications bands may then be passed through a second set of interface filters, to recombine the communications bands onto a common fiber.

However, this technique tends to suffer from a difficulty known as inter-band cross-talk, which results from inherent properties of the interface filters. In practice, filters are non-ideal. Thus, a filter designed to transmit only a desired communications band cannot perfectly block all wavelengths outside the band, but rather, will tend to block such out-of-band wavelengths in proportion to their separation away from the desired band. Thus, wavelengths just outside the desired band may still be transmitted by the filter at significant signal strengths, whereas wavelengths further away from the wavelength range of the desired band will be increasingly blocked, in proportion to their wavelength separation or distance from the boundaries of the desired band. As a result, in the case of adjacent optical communications bands, wavelengths of a first communications band that are close to an adjacent second communications band may travel not only along the amplification path for the first band, but may also be inadvertently passed along the amplification path for the second band. When these latter wavelengths from the second amplification path are recombined with signals at similar wavelengths from the first amplification path, coherent interference may result, severely degrading system performance.

In order to reduce inter-band cross-talk to acceptable levels, "deadbands", or unused wavelength ranges, are typically provided between adjacent communications bands, to increase the spacing between bands, so that for a given communications band, the nearest wavelengths from adjacent bands will be sufficiently blocked by the interface filters. Unfortunately, these deadbands amount to a waste of significant potential communications bandwidth.

In addition, today's increasing demand for bandwidth is tending to result in demand for wider communications bands (as well as narrower channel spacing within a given band). However, a wider communications band requires a wider corresponding transmission window of the filter, which, as a matter of filter design, tends to require a shallower "slope" of the filter response. This results in undesired transmission of out-of-band signals at appreciable signal strengths over an even wider range of out-of-band transmission wavelengths, which increases the effects of inter-band cross-talk. Thus, in order to widen communications bands to accommodate additional bandwidth, it would be necessary to increase the width of the deadbands between the communications bands to prevent unacceptable cross-talk effects, thereby resulting in even greater amounts of wasted potential communications bandwidth.

Although it may be possible to reduce cross-talk effects by adding further interface filters either before or amplification, these approaches are not desirable, as the increased insertion loss resulting from additional pre-amplification filtering tends to result in greater noise in the system, whereas additional post-amplification filtering tends to result in inefficient output power loss, which either partially defeats the purpose of signal amplification or requires greater amplification power to compensate.

Conversely, although at least one approach to reducing cross-talk involves use of a filter in a mid-stage of an amplification path to filter out an entire adjacent communications band, the width of such a filter and its correspondingly shallow-sloped out-of-band response would tend to inadvertently filter at least some signals in the desired communications band, unless significant deadbands were provided between adjacent communications bands.

Accordingly, there is a need for an improved optical amplification method.

SUMMARY OF THE INVENTION

The present invention addresses the above need by providing, in accordance with one aspect of the invention, an optical amplification system including an optical interface filter and an optical amplifier. The optical interface filter is configured to separate a desired communications band from at least one other communications band. The optical amplifier is in communication with the interface filter for amplifying the desired communications band, and includes at least one suppression filter configured to attenuate a wavelength subset of the at least one other communications band nearest the desired communications band and narrower than the at least one other communications band.

Thus, as the suppression filter is configured to attenuate a wavelength subset of the at least one other communications band narrower than the other communications band, the suppression filter has a narrower attenuation range and therefore tends to have a more steeply-sloped transition from attenuated wavelengths to transmitted wavelengths than wider-range filters designed to filter entire bands. Therefore, the deadband or deadbands between the desired communications band and the at least one other communications band may be significantly reduced in width compared to existing systems, without any appreciable inadvertent attenuation by the suppression filter of the desired communications band.

At the same time, it will be appreciated that the inadequacy of the initial filtration provided by the interface filter, resulting from the relatively shallowsloped transition of the interface filter from transmitted to filtered wavelengths, is most appreciable at the region of the other communications band nearest the desired communications band, and is not appreciable far away from the desired communications band. Therefore, as the suppression filter is configured to attenuate the wavelength subset of the at least one other communications band nearest the desired communications band, the attenuation wavelength range of the suppression filter may still be broad enough to attenuate any wavelengths of the at least one other communications band having appreciable signal strengths, thereby suppressing inter-band cross-talk.

Thus, such a system permits deadbands to be significantly reduced in width, thereby reducing wasted potential communications bandwidth, while at the same time adequately suppressing the increased inter-band cross-talk that would otherwise result from a reduction of deadband width.

The suppression filter is preferably configured to attenuate the wavelength subset while forwarding other wavelengths with negligible attenuation. If desired, the suppression filter may be configured to attenuate, as the subset, a wavelength range an order of magnitude narrower than the at least one other communications band.

In accordance with another aspect of the invention, there is provided an optical amplification method, involving separating a desired communications band from at least one other communications band, and amplifying the desired communications band while attenuating a wavelength subset of the at least one other communications band nearest the desired communications band and narrower than the at least one other communications band.

In accordance with another aspect of the invention, there is provided an optical amplification system. The system includes provisions for separating a desired communications band from at least one other communications band, and further includes provisions for amplifying the desired communications band. The provisions for amplifying include provisions for attenuating a wavelength subset of the at least one other communications band nearest the desired communications band and narrower than the at least one other communications band.

Other aspects and features of the present invention will become apparent to those ordinarily skilled in the art upon review of the following description of specific embodiments of the invention in conjunction with the accompanying figures.

DESCRIPTION OF THE DRAWINGS

In drawings which illustrate embodiments of the invention.

DETAILED DESCRIPTION

Figure 1:
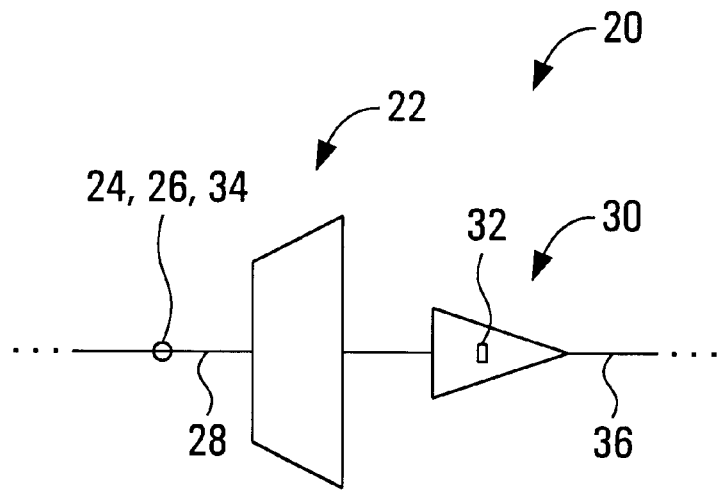
FIG. 1 is a representation of an optical amplification system, according to a first embodiment of the invention.
Figure 2:
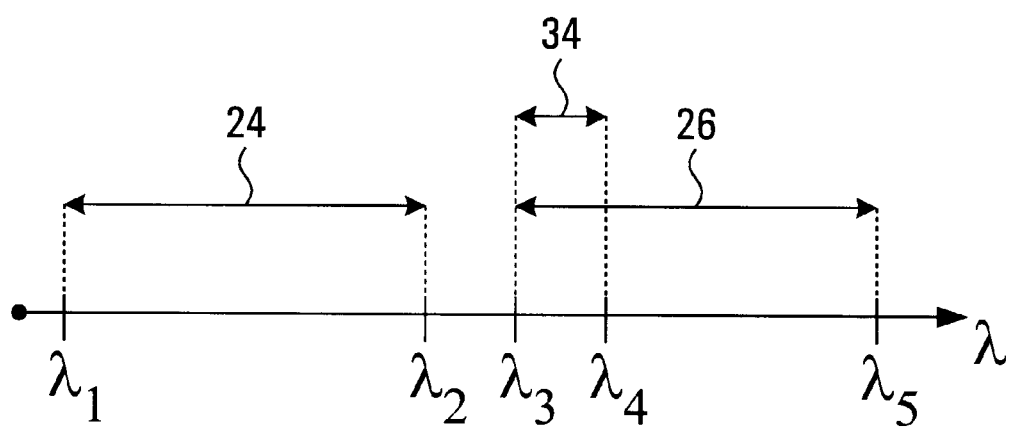
FIG. 2 is a linear graphical representation of a desired communications band, at least one other communications band, and a wavelength subset of the other communications band, according to the first embodiment of the invention.

Referring to FIGS. 1 and 2, an optical amplification system according to a first embodiment of the invention is shown generally at 20 in FIG. 1. The optical amplification system includes an optical interface filter 22 configured to separate a desired communications band 24 from at least one other communications band 26. The optical amplification system 20 further includes an optical amplifier 30 in communication with the optical interface filter 22 for amplifying the desired communications band 24. The optical amplifier 30 includes at least one suppression filter 32 configured to attenuate a wavelength subset 34 of the at least one other communications band 26 nearest the desired communications band 24 and narrower than the at least one other communications band 26.

In this embodiment, the desired communications band 24 and the other communications band 26, including the wavelength subset 34 thereof, are received at the interface filter 22 via an optical fiber 28. Similarly, in this embodiment, the amplified desired communications band 24 is transmitted by the optical amplifier 30 via an optical fiber 36.

System

Figure 3:
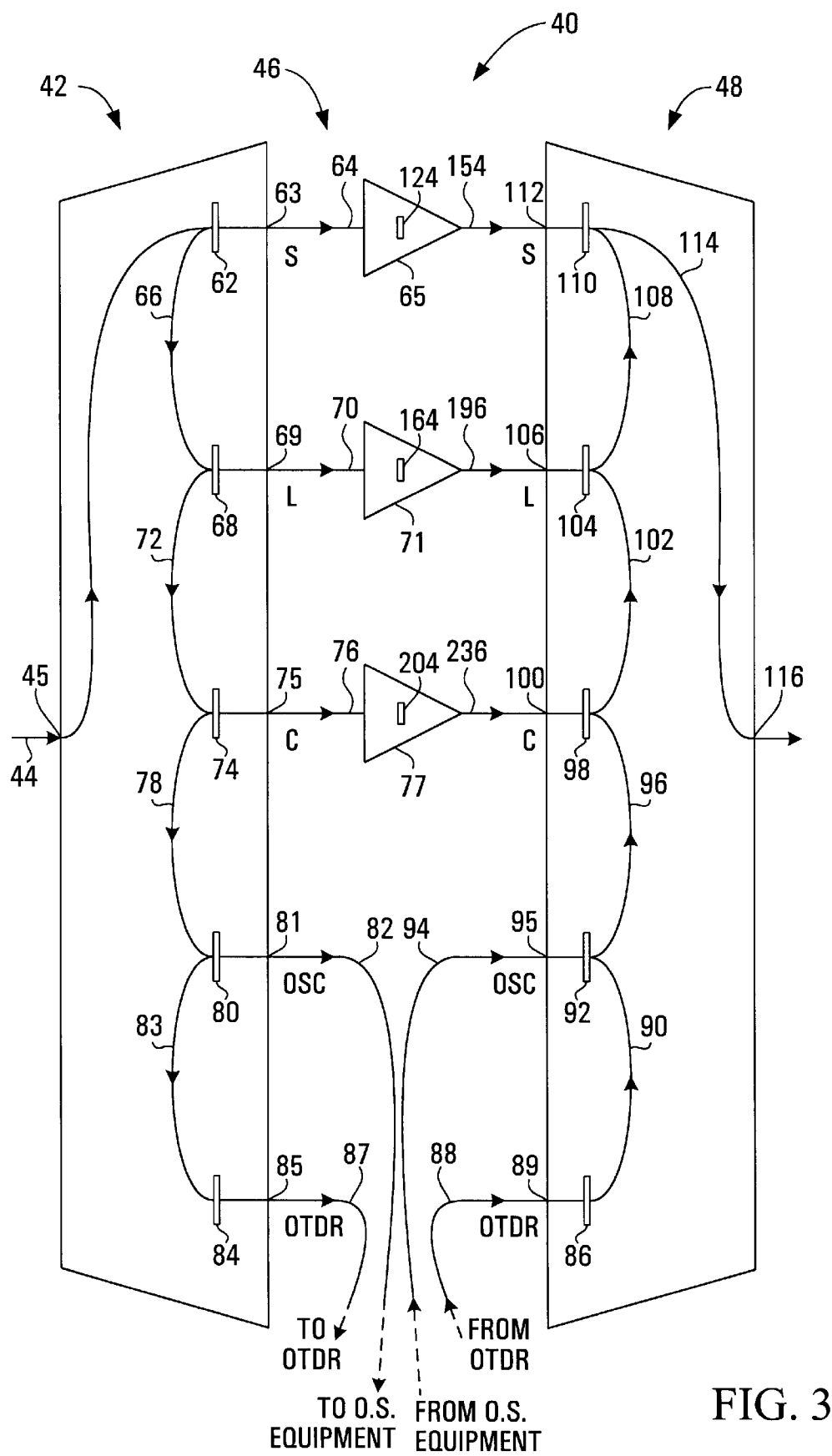
FIG. 3 is a representation of an optical amplification system, according to a second embodiment of the invention.

Referring to FIG. 3, an optical amplification system according to a second embodiment of the invention is shown generally at 40. The optical amplification system 40 includes a first optical interface filter shown generally at 42, configured to separate a desired communications band from at least one other communications band. More particularly, in this embodiment, the first optical interface filter 42 is configured to separate a plurality of desired communications bands from other communications bands, all of which are received at the first optical interface filter 42 via an optical fiber 44 which enters the first optical interface filter 42 at a shared or common port 45 thereof.

In this embodiment, the optical amplification system 40 further includes a plurality of optical amplifiers shown generally at 46. Each of the optical amplifiers 46 is in communication with the first optical interface filter 42 for amplifying a respective desired communications band. In addition, each of the optical amplifiers 46 includes at least one suppression filter configured to attenuate a wavelength subset of at least one other communications band nearest the respective desired communications band and narrower than the at least one other communications band.

Also in this embodiment, the optical amplification system 40 further includes a second optical interface filter 48 for receiving amplified desired communications bands from the optical amplifiers 46.

Communications Bands

Figure 4:
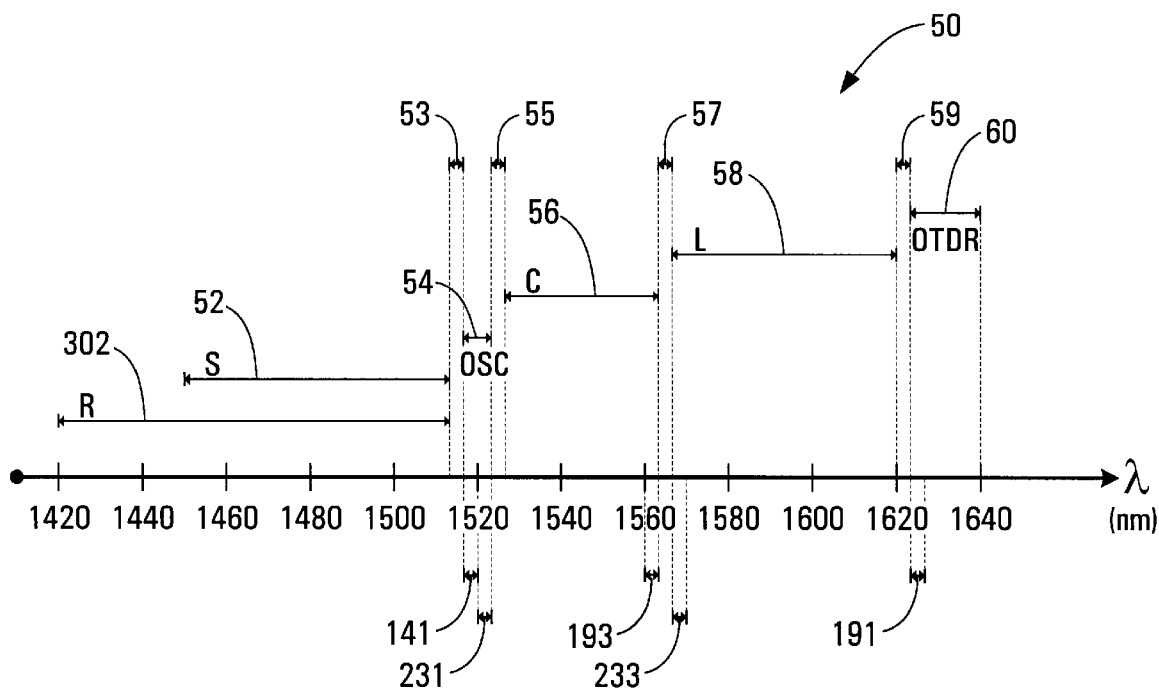
FIG. 4 is a linear graphical representation of a desired communications band, other communications bands, and wavelength subsets of the other communications bands, according to the second embodiment of the invention.

Referring to FIGS. 3 and 4, a plurality of communications bands, which in this embodiment are received at the first optical interface filter 42 via the optical fiber 44, are shown generally at 50 in FIG. 4. In this embodiment, the communications bands 50 include a short wavelength communications band or "S-band" 52, an optical service channel or "OSC-band" 54, a conventional band or "C-band" 56, a long wavelength band or "L-band" 58, and a test channel band, which in this embodiment is an optical time domain reflectometer band or "OTDR-band" 60. More particularly, this embodiment, the S-band 52 ranges from 1450.024 to 1514.486 nm, the OSC-band ranges from 1516.785 to 1525.273 nm, the C-band 56 ranges from 1527.605 to 1565.905 nm, the L-band ranges from 1569.183 to 1620.062 nm, and the OTDR-band 60 ranges from 1624 to 1638 nm.

In this embodiment the communications bands 50 further include a plurality of unused wavelength ranges or "deadbands" defined between the various communications bands. More particularly, in this embodiment the deadbands include a first deadband 53 defined between adjacent boundaries of the S-band 52 and the OSC-band 54, a second deadband 55 defined between adjacent boundaries of the OSC-band 54 and the C-band 56, a third deadband 57 defined between adjacent boundaries of the C-band 56 and the L-band 58, and a fourth deadband 59 defined between adjacent boundaries of the L-band 58 and the OTDR-band 60.

It will be appreciated that the deadbands 53, 55, 57 and 59 in the present embodiment are generally narrower than those used in conventional systems, as deadbands of such narrow width would tend to produce unacceptable inter-band crosstalk in conventional systems.

Alternatively, other communications bands and other narrower or wider deadbands therebetween may be substituted if desired.

Interface Filters

Referring to FIGS. 3 and 4, in this embodiment, the first optical interface filter 42 includes a plurality of individual interface filters, which in this embodiment includes first, second, third, fourth and fifth individual interface filters 62, 68, 74, 80 and 84 respectively, each configured to separate a respective desired communications band from the other communications bands received in the optical fiber 44.

In this embodiment, the first individual interface filter 62 is configured to separate a desired communications band, or more particularly the S-band 52, from the other communications bands received via the optical fiber 44. The first individual interface filter 62 transmits the S-band 52 via an S-band port 63 of the first optical interface filter 42, along an optical fiber span 64 to an S-band optical amplifier 65, and reflects other wavelengths, including the remaining communications bands 54, 56, 58 and 60, on an optical fiber span 66 to the second individual interface filter 68.

Similarly, in this embodiment the second individual interface filter 68 is configured to separate a desired communications band, or more particularly the L-band 58, from the other communications bands received in the optical fiber span 66. The second individual interface filter 68 transmits the L-band 58 via an L-band port 69 along an optical fiber span 70 to an L-band optical amplifier 71, and reflects other wavelengths, including the remaining communications bands 54, 56 and 60, along an optical fiber span 72 to the third individual interface filter 74.

The third individual interface filter 74 in the present embodiment is configured to separate a desired communications band, or more particularly the C-band 56, from the other communications bands received in the optical fiber span 72. The third individual interface filter 74 transmits the C-band 56 via a C-band port 75 along an optical fiber span 76 to a C-band optical amplifier 77 and reflects other wavelengths, including the remaining communications bands 54 and 60, along an optical fiber span 78 to the fourth individual interface filter 80.

In this embodiment the first optical interface filter 42 is configured to drop off an optical service channel, after separating the desired communications band from the at least one other communications band. More particularly, in this embodiment the fourth individual interface filter 80 receives optical signals along the optical fiber span 78, and drops off the optical service channel by transmitting the OSC-band 54 via an OSC-band port 81 along an optical fiber span 82 to optical service equipment (not shown). The fourth individual interface filter reflects other wavelengths including the OTDR-band 60 along an optical fiber span 83 to the fifth individual interface filter 84, which is configured to transmit the OTDR-band 60 via an OTDR-band port 85 along an optical fiber span 87 to an optical time domain reflectometer (not shown).

If desired, the first optical interface filter 42 may include additional optical fiber spans, additional filters, or other additional components (not shown). For example, for some applications, it may be desirable to provide optical taps to siphon off a small percentage, such as two percent for example, of the signals transmitted by any of the individual interface filters 62, 68, 74, 80 or 84, for monitoring purposes. In addition, although the first optical interface filter 42 has been shown as a unidirectional filter for ease of illustration, alternatively, bi-directional versions may be substituted if desired. More generally, any other optical interface filter configured to separate a desired communications band from at least one other communications band may be substituted for the first optical interface filter 42.

Referring to FIGS. 3 and 4, it will be appreciated that each of the individual interface filters 62, 68, 74, 80 and 84 is non-ideal. Accordingly, in the present embodiment, the first individual interface filter 62 inadvertently transmits at least a portion of the OSC-band 54 which is nearest to the S-band 52, to the S-band optical amplifier 65 via the S-band port 63, and also inadvertently reflects a small proportion of the S-band 52 along the optical fiber span 66. Similarly, the second individual interface filter 68 inadvertently transmits at least a portion of the OTDR-band 60 nearest the L-band 58, as well as a portion of the C-band 56 nearest the L-band 58, to the L-band optical amplifier 71 via the L-band port 69, and also inadvertently reflects a small proportion of the L-band 58 along the optical fiber span 72. Likewise, the third individual interface filter 74 inadvertently transmits at least a portion of the OSC-band 54 nearest the C-band 56, as well as a portion of the L-band 58 (to the extent that any such L-band radiation was inadvertently reflected by the second individual interface filter 68) nearest the C-band 56, to the C-band optical amplifier 77 via the C-band port 75, and also inadvertently reflects a small proportion of the C-band 56 along the optical fiber span 78.

Although it may be possible to further reduce the undesired inadvertently transmitted portions of adjacent communications bands by adding further individual filtering devices in the first optical interface filter 42, it is not desirable to do so, as such additional initial filtration tends to increase insertion loss in the optical communications bands. Similarly, although it may also be possible to reduce the amount of inadvertent reflection of the desired transmission band by a given filter, it is undesirable to do so as this requires a more complex filter design which will tend to increase insertion loss and cost of the device. It may also be possible to design a filter with sharper edges closer to the transmission band which is capable of more suppression in the adjacent bands, however, it is undesirable to do so as this tends to increase the amount of unwanted reflection, and also tends to decrease system performance through phase-domain distortions which tend to be more pronounced near the edges of such filters and which tend to increase with the rate of change of the attenuation function with respect to wavelength. In addition, it is advantageous, for in-band performance, to allow the interface filters to be wider than the desired transmission band to limit distortion at the band edge.

Still referring to FIGS. 3 and 4, in this embodiment the second optical interface filter 48 includes sixth, seventh, eighth, ninth and tenth individual interface filters 86, 92, 98, 104 and 110 respectively. It will be appreciated that as most three-port filters are inherently bidirectional, the same general design of filter may be used for both the first and second optical interface filters 42 and 48.

In this embodiment the sixth individual interface filter 86 is configured to transmit an OTDR-band 60 of an optical signal, received from an optical time domain reflectometer (not shown) on an optical fiber span 88 via an OTDR-band port 89 of the second optical interface filter 48, along an optical fiber span 90 to the seventh individual interface filter 92.

The seventh individual interface filter 92 in the present embodiment is configured to reflect the OTDR-band 60 received on the optical fiber span 90, along an optical fiber span 96 to the eighth individual interface filter 98. The seventh individual interface filter 92 also transmits the OSC-band 54 of an optical signal, received from optical service equipment (not shown) on an optical fiber span 94 via an OSC-band port 95 of the second optical interface filter 48, along the optical fiber span 96 to the eighth individual interface filter 98.

Similarly, in this embodiment the eighth individual interface filter 98 is configured to transmit an amplified C-band 56 signal, received from the C-band optical amplifier 77 at a C-band port 100, along an optical fiber span 102 to the ninth individual interface filter 104. The eighth individual interface filter 98 also reflects the OSC-band 54 and the OTDR band 60 received along the optical fiber span 96, along the optical fiber span 102 to the ninth individual interface filter 104.

The ninth individual interface filter 104 in the present embodiment is configured to reflect the OTDR-band 60, the OSC-band 54, and the amplified C-band 56 received along the optical fiber span 102, along an optical fiber span 108 to the tenth individual interface filter 110. The ninth individual interface filter 104 also transmits an amplified L-band 58 signal, received from the L-band optical amplifier 71 at an L-band port 106, along the optical fiber span 108 to the tenth individual interface filter 110.

In this embodiment the tenth individual interface filter 110 is configured to reflect the amplified L-band 58, the amplified C-band 56, the OSC-band 54 and the OTDR-band 60 received along the optical fiber span 108, along an optical fiber span 114 to a shared or common port 116. The tenth individual interface filter 110 also transmits an amplified S-band 52 signal, received from the S-band optical amplifier 65 at an S-band port 112, along the optical fiber span 114 to the common port 116.

As with the first optical interface filter 42, in this embodiment the various individual interface filters of the second optical interface filter 48 are also non-ideal. Therefore, in this embodiment, each of the eighth, ninth and tenth individual interface filters 98, 104 and 110 inadvertently reflects a small proportion of its corresponding desired amplified transmission band. Similarly, if any portions of undesired adjacent communications bands were inadvertently transmitted across the amplification path preceding a given individual interface filter, portions of such undesired bands nearest the desired communications band would also tend to be inadvertently transmitted by the individual interface filter (although, as discussed in greater detail below, in the present embodiment such undesired portions are subjected to additional suppression filtering within the amplification path itself).

Alternatively, other suitable means for recombining the various communications bands onto an optical fiber may be substituted.

In this embodiment, each of the individual interface filters 62, 68, 74, 80, 84, 86, 92, 98, 104 and 110 includes a dielectric interference filter. Alternatively, however, other types of filters, such as fiber Bragg gratings, fused fiber tapers, or waveguide filters for example, may be substituted if desired.

Amplifiers

S-band Amplifier

Figure 5:
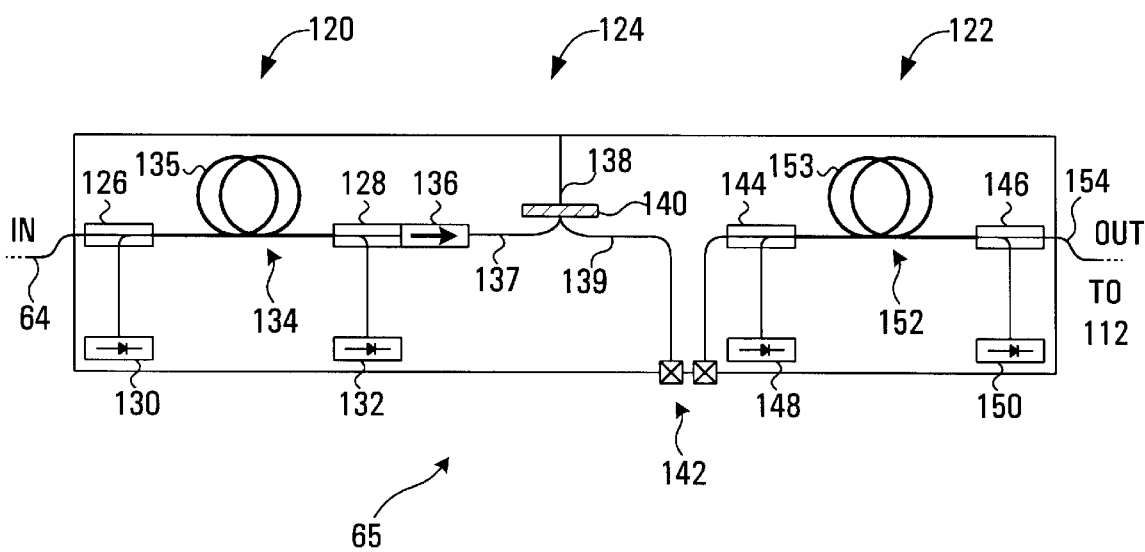
FIG. 5 is a schematic representation of a first optical amplifier of the system shown in FIG. 3.

Referring to FIGS. 3, 4 and 5, the S-band optical amplifier is shown generally at 65 in FIG. 5. In this embodiment, the S-band optical amplifier 65 amplifies a desired communications band, while attenuating a wavelength subset of at least one other communications band nearest the desired communications band and narrower than the at least one other communications band. More particularly, in this embodiment, the desired communications band corresponding to the S-band optical amplifier is the S-band 52 and the at least one other communications band includes the OSC-band 54.

In the present embodiment, the S-band optical amplifier 65 includes a first amplifying portion 120, a second amplifying portion 122, and a suppression filtering portion 124 interposed between the first and second amplifying portions 120 and 122.

More particularly, in this embodiment the first amplifying portion 120 includes first and second multiplexers 126 and 128, first and second pump sources 130 and 132 in communication with the first and second multiplexers respectively, and a photon multiplying portion 134. More particularly still, in this embodiment the photon multiplying portion 134 includes a thulium-doped optical fiber span 135, each of the pump sources 130 and 132 includes a respective diode laser, and each of the multiplexers 126 and 128 includes a directional wavelength division multiplexer. Alternatively, however, other types of amplifying portions may be substituted for the first amplifying portion 120.

In this embodiment, to provide amplification of the S-band optical signals arriving on the optical fiber span 64, the arriving S-band optical signals and excitation radiation produced by the pump sources 130 and 132 are simultaneously wavelength-division-multiplexed onto the thulium-doped optical fiber span 135. Many choices of a suitable excitation wavelength or wavelengths will be apparent to one of ordinary skill in the art when presented with this specification. In this regard, thulium fiber may be excited by wavelengths close to 800 nm, 1060 nm or 1064 nm for example, or by multi-pump schemes involving one or more such wavelengths as well as further excitation radiation at or near 1545 nm, 1117–1200 nm, and/or 1560–1600 nm, for example.

The excitation radiation produced by the diode laser pump sources 130 and 132 excites thulium ions within the thulium-doped optical fiber span 135 to metastable states at higher energy levels than their initial ground energy state. The arrival of the S-band optical signals results in stimulated emission by the excited metastable thulium ions, of additional photons at the same wavelengths as the S-band optical signals, effectively producing a signal gain or amplification of the incoming S-band optical signals, by increasing the number of photons at all wavelengths of the S-band signals. The ions that produce such additional photons drop to a lower energy state, and are then quickly re-excited to a higher energy metastable state by the excitation radiation.

In addition to such desired stimulated emissions, a relatively small amount of spontaneous emission by the excited ions tends to occur. Also, although most of the excitation radiation produced by the pump sources 130 and 132 is absorbed by the thulium ions in the thulium-doped optical fiber span 135, a small amount of residual excitation radiation produced by the pump source 130 arrives at the second multiplexer 128 which redirects most such residual excitation radiation to an isolator (not shown) at the pump source 132 where it is discarded. Conversely, residual excitation radiation produced by the pump source 132 arriving at the first multiplexer 126 is redirected to an isolator (not shown) at the pump source 130 where it is discarded. In the present embodiment, to the extent that any amount of such residual excitation radiation may be transmitted out of the first amplifying portion 120, such residual excitation radiation may typically be neglected, and is further suppressed by the optical interface filters 42 and 48. However, in alternative embodiments of the invention in which excitation wavelengths for one communications band overlap with communication wavelengths of another communications band, additional suppression of such residual excitation wavelengths may be desirable.

Referring to FIGS. 3, 4 and 5, in this embodiment, the suppression filtering portion 124 shown in FIG. 5 includes an optical isolator 136, and optical fiber spans 137, 138 and 139 in communication with a suppression filter 140. In this embodiment, the suppression filter 140 is configured to attenuate a wavelength subset 141 of the at least one other communications band, i.e. the OSC-band 54, nearest the desired communications band, i.e. the S-band. 52, and narrower than the OSC-band. More particularly, in this embodiment, the wavelength subset 141 includes a 6 nm portion of the OSC-band 54 nearest the S-band 52, or in other words, a wavelength range from 1516.785 to 1522.785 nm. In this regard, it has been found that the inadequacies of the initial separation provided by the first individual interface filter 62 and the post-amplification filtering provided by the tenth individual interface filter 110 are appreciable only within the wavelength subset 141, and are not appreciable at longer wavelengths. Thus, the suppression filter 140 serves to augment the initial and post-amplification separations provided by the first and tenth individual interface filters 62 and 110 in the wavelength region where such augmented attenuation is most needed due to the shallow-sloped response of the first and tenth individual interface filters 62 and 110 just outside the boundaries of the desired wavelength range.

In the present embodiment the suppression filter 140 is configured to attenuate the wavelength subset 141 by transmitting the wavelength subset 141 along the optical fiber span 138 to be discarded, and is configured to forward other wavelengths by reflecting them along the optical fiber span 139 for receipt by the second amplifying portion 122. If desired, the optical fiber span 138 may be placed in communication with a further optical component (not shown) such as an isolator for example, for the purpose of discarding the wavelength subset 141.

In this embodiment the optical isolator 136 is configured to discard any electromagnetic radiation travelling in the direction back toward the first optical interface filter 42. The optical isolator thus reduces deleterious effects such as backwards-travelling amplified spontaneous emission (ASE) and multi-path interference, for example.

Wavelengths forwarded by the suppression filter 140 along the optical fiber span 139 are then directed to the second amplifying portion 122 of the S-band optical amplifier 65, via fiber connectors shown generally at 142. In this embodiment, the fiber connectors 142 provide a mid-stage access point for the S-band optical amplifier 65, to permit connection of other optical devices (not shown) for performing desired optical functions, such as dispersion compensation or gain flattening, for example. Alternatively, however, the fiber connectors 142 may be omitted if desired, in which case the optical fiber span 137 may continue past the suppression filter 140 directly to the second amplifying portion 122.

In this embodiment, the suppression filter 140 is configured to attenuate the wavelength subset 141, while forwarding other wavelengths with negligible attenuation. Due to the narrowness of the attenuation band of the suppression filter 140, which in this embodiment attenuates only the 6 nm wide wavelength subset 141 of the OSC-band 54, the spectral response of the suppression filter 140 is much more steeply-sloped than would be possible for filters configured to attenuate wider wavelength ranges, more closely approximating the theoretical ideal of a vertically-sloped response at the boundaries of the wavelength subset 141. Accordingly, unlike a broaderband attenuation filter which would tend to inadvertently attenuate wavelengths well outside the desired attenuation band, the suppression filter 140 of the present embodiment does not appreciably inadvertently attenuate the longer wavelength portions (or any other portion) of the S-band 52, even in the present embodiment where the deadband 53 between the OSC-band 54 and the S-band 52 is narrower than conventional deadbands.

In the present embodiment, the suppression filter 140 includes a dielectric interference filter having negligible out-of-band attenuation characteristics. Thus, in this embodiment the suppression filter 140 is configured to attenuate the wavelength subset 141 by transmitting it along the optical fiber span 138 to be discarded, while forwarding the S-band 52 by reflecting it with negligible attenuation along the optical fiber span 139. Alternatively, however, other types of filters may be substituted as desired. For example, a dielectric interference filter configured to attenuate the wavelength subset 141 by reflecting it back along the optical fiber span 137 to be discarded by the optical isolator 136, while forwarding the S-band 52 by transmitting it with negligible attenuation along the optical fiber span 139, may be substituted if desired. Or, a fiber Bragg grating configured to reflect the wavelength subset 141 back to the optical isolator 136 may be substituted for the dielectric interference filter, although this would not be recommended in the case of the S-band optical amplifier 65, as it has been found that fiber Bragg gratings tend to introduce a cladding mode ripple effect in transmitted wavelengths shorter than the reflected wavelengths. Therefore, in the case of the S-band optical amplifier, use of a fiber Bragg grating to attenuate the longer-wavelength OSC-band would tend to introduce the undesirable cladding mode ripple effect in the desired S-band 52 itself.

Referring to FIGS. 3 and 5, the second amplifying portion 122 is similar to the first amplifying portion 120, and includes first and second multiplexers 144 and 146, first and second pump sources 148 and 150, and a photon multiplying portion 152 which in this embodiment includes a thulium-doped optical fiber span 153. Twice-amplified, suppression-filtered S-band signals are provided via an optical fiber span 154 to the S-band port 112 of the second optical interface filter 48 shown in FIG. 3.

Advantageously, by providing the suppression filtering portion 124 at a mid-stage of the S-band optical amplifier 65, between the first and second amplifying portions 120 and 122, disadvantageous increases in noise and/or decreases in output power efficiency which would arise from providing additional filtering either prior to or after the S-band optical amplifier 65 respectively are avoided.

L-band Amplifier

Figure 6:
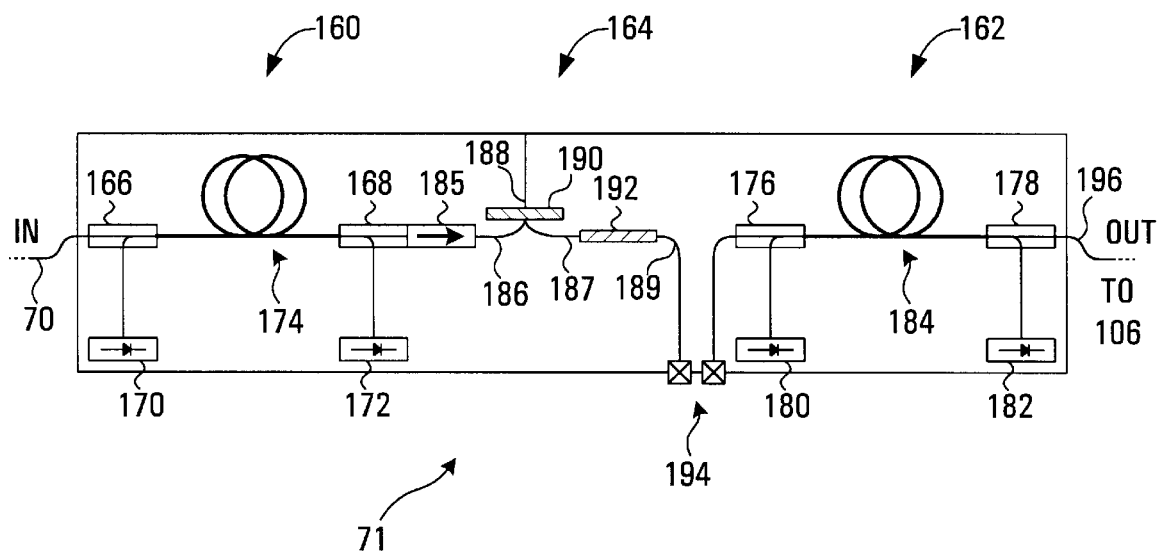
FIG. 6 is a schematic representation of a second optical amplifier of the system shown in FIG. 3.

Referring to FIGS. 3 and 6, the L-band optical amplifier is shown generally at 71 in FIG. 6. In this embodiment, the L-band optical amplifier 71 amplifies a desired communications band (in this case, the L-band 58) while attenuating a wavelength subset of at least one other communications band (in this case, wavelength subsets of the OTDR-band 60 and the C-band 56) nearest the desired communications band and narrower than the at least one other communications band.

The L-band optical amplifier 71 in the present embodiment includes a first amplifying portion 160, a second amplifying portion 162, and a suppression filtering portion 164 interposed between the first and second amplifying portions 160 and 162. In this embodiment, the first amplifying portion 160 includes first and second multiplexers 166 and 168, first and second pump sources 170 and 172, and a photon multiplying portion 174. Similarly, in this embodiment, the second amplifying portion 162 includes first and second multiplexers 176 and 178, first and second pump sources 180 and 182, and a photon multiplying portion 184.

Referring to FIGS. 3, 5 and 6, effectively, in this embodiment the first and second amplifying portions 160 and 162 of the L-band optical amplifier 71 are similar to the first and second amplifying portions 120 and 122 of the S-band optical amplifier 65 shown in FIG. 5, except that in the present embodiment, the photon multiplying portions 174 and 184 each include respective erbiumdoped (rather than thulium-doped) optical fiber spans, which are functionally similar to the thulium-doped optical fiber spans 135 and 153, although it has been found that erbium is better-suited than thulium to provide amplification across the L-band 58. Also, in this embodiment the pump sources 170, 172, 180 and 182 may be driven at different excitation wavelengths (typically near 1480 nm and/or 980 nm, for example) and at different input power levels than their counterpart pump sources 130, 132, 148 and 150, depending on the expected signal strengths of L-band signals received on the optical fiber span 70, and the desired L-band signal strength that is to be provided at the L-band port 106 of the second optical interface filter 48 shown in FIG. 3.

However, referring to FIGS. 3, 4, 5 and 6, in this embodiment the suppression filtering portion 164 of the L-band optical amplifier 71 differs from that of the S-band optical amplifier 65. More particularly, in this embodiment the suppression filtering portion 164 includes an optical isolator 185, a first suppression filter 190 and a second suppression filter 192, in communication with each other via optical fiber spans 186 and 187. In this embodiment the first suppression filter 190 is in communication with a further optical fiber span 188, and the second suppression filter 192 is in communication with the second amplifying portion 162 via a further optical fiber span 189.

In this embodiment, the first suppression filter 190 is configured to attenuate a wavelength subset 191 of at least one other communications band, or more particularly of the OTDR-band 60, nearest the desired communications band (the L-band 58) and narrower than the OTDR-band 60. More particularly still, in this embodiment, the wavelength subset 191 includes a 6 nm portion of the OTDR-band 60 nearest the L-band 58, or in other words, a wavelength range from 1624 to 1630 nm. In this embodiment the first suppression filter 190 is configured to attenuate the wavelength subset 191 by transmitting such wavelengths along the optical fiber span 188 to be discarded, and is configured to reflect other wavelengths along the optical fiber span 187 to the second suppression filter.

Similarly, in this embodiment, the second suppression filter 192 is configured to attenuate a wavelength subset 193 of at least one other communications band, or more particularly of the C-band 56, nearest the desired communications band (the L-band 58) and narrower than the C-band 56. More particularly still, in this embodiment, the wavelength subset 193 includes a 6 nm portion of the C-band 56 nearest the L-band 58, or in other words, a wavelength range from 1559.905 to 1565.905 nm. Thus, on a scale of orders of magnitude, in the present embodiment the suppression filter 192 is configured to attenuate, as the wavelength subset 193, a wavelength range an order of magnitude narrower than the at least one other communications band. In this embodiment the second suppression filter 192 is configured to reflect the wavelength subset 193 back along the optical fiber span 187, and to transmit other wavelengths along the optical fiber span 189.

With respect to the attenuation ranges of the first and second suppression filters 190 and 192, it has been found that the inadequacies of the initial and post-amplification separations provided by the second and ninth individual interface filters 68 and 104 are appreciable only within the wavelength subsets 191 and 193 nearby the L-band 58, and are not appreciable at wavelengths longer than the wavelength subset 191 or shorter than the wavelength subset 193. Thus, the first and second suppression filters 190 and 192 serve to augment the initial and post-amplification separations provided by the second and ninth individual interface filters 68 and 104 in the wavelength regions where such augmented attenuation is most needed due to the shallow-sloped response of the second and ninth individual interface filters 68 and 104 just outside the boundaries of the desired wavelength range.

In this embodiment, rejected wavelengths transmitted by the first suppression filter 190 along the optical fiber span 188 are discarded. If desired, the optical fiber span 188 may be placed in communication with an isolator or other optical device (not shown) for this purpose. Similarly, rejected wavelengths reflected by the second suppression filter 192 are directed back along the optical fiber span 187 to the first suppression filter 190, which reflects such wavelengths back along the optical fiber span 186 to the optical isolator 185, which is configured to discard any such wavelengths rejected or attenuated by the second suppression filter 192.

More generally, in this embodiment the optical isolator 185 discards any electromagnetic radiation travelling in the direction back toward the first optical interface filter 42. In this regard, it will be appreciated that optical isolators are typically desirable in the design of optical amplifiers, to reduce deleterious effects such as backwards-travelling amplified spontaneous emission (ASE) and multi-path interference, for example. With respect to relative placement of the isolator 185 and the suppression filters 190 and 192, it is preferable to first select the placement of the optical isolator 185 in accordance with the best design practice for the particular amplifier, and to then select the placement of the suppression filters, preferably at a location downstream in the optical chain from the isolator. For efficiency purposes, it is advantageous to place the suppression filters as early (upstream) in the amplifying chain as practical, to avoid inefficient amplification of undesired signals in the undesired wavelength subset of the other communications band, although placing the suppression filters upstream of all amplification would undesirably result in additional insertion loss and increased noise. In the present embodiment, it has been found that the configuration shown in FIG. 6 adequately balances these concerns, although alternatively, other configurations may be substituted if desired.

Wavelengths forwarded by the suppression filters 190 and 192 along the optical fiber span 189 are then directed to the second amplifying portion 162 of the L-band optical amplifier 71, via fiber connectors shown generally at 194.

In this embodiment, the suppression filters 190 and 192 are configured to attenuate the wavelength subsets 191 and 193, while forwarding other wavelengths with negligible attenuation. Due to the narrowness of the respective attenuation bands of the suppression filters 190 and 192, which in this embodiment attenuate only the 6 nm wide wavelength subset 191 of the OTDR-band 60 and the 6 nm wide wavelength subset 193 of the C-band 56 respectively, the spectral responses of the suppression filters 190 and 192 are much more steeply-sloped at the boundaries of the wavelength subsets 191 and 193 than would be possible for filters configured to attenuate wider wavelength ranges. Accordingly, unlike broader-band attenuation filters, the suppression filters 190 and 192 of the present embodiment do not appreciably inadvertently attenuate the longer wavelength portions of the desired L-band 58 or the shorter wavelength portions of the L-band 58, respectively, even in the present embodiment where the deadbands 57 and 59 are narrower than those used in conventional systems.

More particularly, in this embodiment the first suppression filter 190 includes a dielectric interference filter having negligible out-of-band attenuation characteristics, which is configured to attenuate the wavelength subset 191 by transmitting it along the optical fiber span 188 to be discarded, while forwarding the L-band 58 by reflecting it with negligible attenuation along the optical fiber span 187. Alternatively, however, other types of filters may be substituted if desired. For example, a dielectric interference filter configured to attenuate the wavelength subset 191 by reflecting it back along the optical fiber span 186 to be discarded by the optical isolator 185, while forwarding the L-band 58 by transmitting it with negligible attenuation along the optical fiber span 187, may be substituted if desired. Or, a fiber Bragg grating may be substituted as the first suppression filter, although this would not be recommended, due to the cladding mode ripple effect referred to earlier herein.

However, in the present embodiment the second suppression filter 192 includes a fiber Bragg grating, also having negligible out-of-band attenuation characteristics. As the second suppression filter 192 is being used to attenuate wavelengths shorter than the desired L-band 58 rather than longer than the desired band, a fiber Bragg grating may be used for this purpose without introducing cladding mode ripple in the desired L-band itself. The fiber Bragg grating is preferable to a dielectric filter for attenuating undesired wavelengths shorter than the wavelengths of the desired communications band, as the transmission characteristics of a fiber Bragg grating may be configured to reduce undesirable effects, such as group delay ripple or insertions loss ripple for example, in the desired communications band. Alternatively, however, other types of suppression filters may be substituted.

Amplified suppression-filtered L-band signals are then further amplified by the second amplifying portion 162 in a manner similar to the amplification provided by the first amplifying portion 160. Twice-amplified, suppression-filtered L-band signals are then provided via an optical fiber span 196 to the L-band port 106 of the second optical interface filter 48 shown in FIG. 3.

C-band Amplifier

Figure 7:
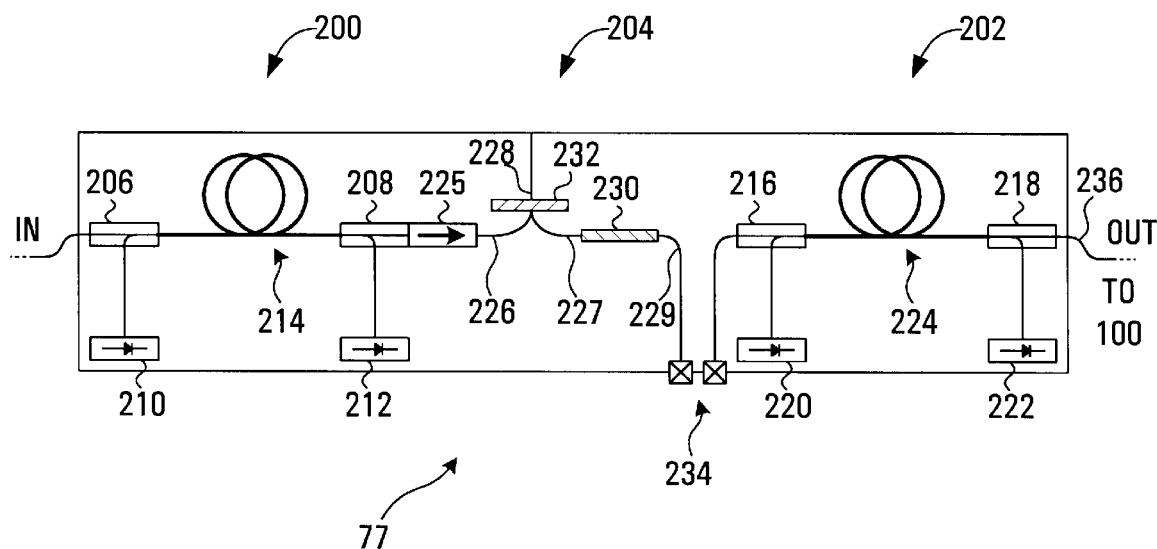
FIG. 7 is a schematic representation of a third optical amplifier of the system shown in FIG. 3.

Referring to FIGS. 3 and 7, the C-band optical amplifier is shown generally at 77 in FIG. 7. In this embodiment, the C-band optical amplifier 77 amplifies a desired communications band (in this case the C-band 56) while attenuating a wavelength subset of at least one other communications band (in this case, the at least one other communications band includes the OSC-band 54 and the L-band 58) nearest the desired communications band and narrower than the at least one other communications band.

The C-band optical amplifier 77 in the present embodiment includes a first amplifying portion 200, a second amplifying portion 202, and a suppression filtering portion 204 interposed between the first and second amplifying portions 200 and 202. In this embodiment, the first amplifying portion 200 includes first and second multiplexers 206 and 208, first and second pump sources 210 and 212, and a photon multiplying portion 214. Similarly, in this embodiment, the second amplifying portion 202 includes first and second multiplexers 216 and 218, first and second pump sources 220 and 222, and a photon multiplying portion 224.

Referring to FIGS. 3, 6 and 7, in this embodiment the C-band optical amplifier 77 is somewhat similar to the L-band optical amplifier 71 shown in FIG. 6. More particularly, in this embodiment the first and second amplifying portions 200 and 202 of the C-band optical amplifier 77 are similar to the first and second amplifying portions 160 and 162 of the L-band optical amplifier 71 shown in FIG. 6, the photon multiplying portions 214 and 224 each including respective erbium-doped optical fiber spans, except that the pump sources 210, 212, 220 and 222 may be driven at different excitation wavelengths (typically near 980 nm and/or 1480 nm) and/or different input power levels than their counterpart pump sources 170, 172, 180 and 182, depending on the expected signal strengths of C-band signals received on the optical fiber span 76, and the desired C-band signal strength that is to be provided at the C-band port 100 of the second optical interface filter 48 shown in FIG. 3.

Similarly, referring to FIGS. 3, 4, 6 and 7, in this embodiment the suppression filtering portion 204 of the C-band optical amplifier 77 is also functionally somewhat similar to the suppression filtering portion 164 of the L-band optical amplifier 71. More particularly, in this embodiment the suppression filtering portion 204 includes an optical isolator 225, a first suppression filter 230 and a second suppression filter 232 in communication with each other via optical fiber spans 226 and 227. In this embodiment the second suppression filter 232 is in communication with a further optical fiber span 228, and the first suppression filter 230 is in communication with the second amplifying portion 202 via a further optical fiber span 229.

In this embodiment, the second suppression filter 232 is configured to attenuate a wavelength subset 233 of another communications band, or more particularly of the L-band 58, nearest the desired communications band (the C-band 56) and narrower than the L-band 58. In this regard, although most of the L-band 58 is filtered out by the operation of the second individual interface filter 68 shown in FIG. 3, at least some wavelengths of the L-band 58 tend to be inadvertently reflected to the third individual interface filter 74, which also tends to inadvertently transmit at least some such L-band 58 wavelengths, most appreciably within the wavelength subset 233 of the L-band nearest the C-band 56. More particularly, in this embodiment, the wavelength subset 233 includes a 6 nm portion of the L-band 58 nearest the C-band 56, or in other words, a wavelength range from 1569.183 to 1575.183 nm. Thus, on a scale of orders of magnitude, in the present embodiment the second suppression filter 232 is configured to attenuate, as the wavelength subset 233, a wavelength range an order of magnitude narrower than the other communications band. In this embodiment the second suppression filter 232 is configured to attenuate the wavelength subset 233 by passing it along the optical fiber span 228 to be discarded, and is configured to forward other wavelengths by reflecting them along the optical fiber span 227 to the first suppression filter 230.

Similarly, in this embodiment, the first suppression filter 230 is configured to attenuate a wavelength subset 231 of another communications band, or more particularly of the OSC-band 54, nearest the desired communications band (the C-band 56) and narrower than the OSC-band 54. More particularly, in this embodiment, the wavelength subset 231 is a 6 nm portion of the OSC-band 54 nearest the C-band 56, or in other words, a wavelength range from 1519.273 to 1525.273 nm. The first suppression filter 230 is configured to attenuate the wavelength subset 231 by reflecting it back along the optical fiber span 227, and is configured to forward other wavelengths by reflecting them along the optical fiber span 229.

Referring to FIGS. 3, 4 and 7, with respect to the attenuation ranges of the first and second suppression filters 230 and 232, it has been found that the inadequacies of the initial and post-amplification separations provided by the third and eighth individual interface filters 74 and 98 are appreciable only within the wavelength subsets 231 and 233 nearby the C-band 56, and are not appreciable at wavelengths more distant from the C-band 56. Thus, the first and second suppression filters 230 and 232 serve to augment the initial and post-amplification separation provided by the third and eighth individual interface filters 74 and 98 in the wavelength regions where such augmented attenuation is most needed due to the shallow-sloped response of the third and eighth individual interface filters 74 and 98 just outside the boundaries of the desired wavelength range.

Alternatively, however, in some embodiments either or both of the suppression filters 230 and 232 may be omitted. For example, in some embodiments, if the inadequacies of the interface filters, including the inadvertent reflection of the L-band 58 by the second individual interface filter 68 and the inadvertent transmission of such wavelengths by the third individual interface filter 68, are within tolerable limits for a particular application, the second suppression filter 232 may be omitted. Similarly, with respect to the wavelength subset 231 of the OSC-band 54, it has been found that the gain provided by erbium-doped amplifiers, such as that provided by the C-band amplifier 77 in the present embodiment, drops off sharply at wavelengths shorter than 1526 nm and therefore, the wavelength subset 231 would be amplified significantly less than the C-band 56 if it were allowed to pass through the C-band amplifier 77. Therefore, in some embodiments it may be possible to omit the first suppression filter 230, depending on the applicable crosstalk tolerance limits.

In this embodiment, rejected wavelengths transmitted by the second suppression filter 232 along the optical fiber span 228 are discarded. If desired, the optical fiber span 228 may be placed in communication with an isolator or other optical device (not shown) for this purpose. Conversely, wavelengths forwarded (in this embodiment, reflected) by the second suppression filter 232 are directed along the optical fiber span 227 to the first suppression filter 230. Similarly, rejected wavelengths reflected by the first suppression filter 230 are directed back along the optical fiber span 227 to the second suppression filter 232, which in turn reflects such wavelengths back along the optical fiber span 226 to the optical isolator 225, which is configured to discard any electromagnetic radiation travelling in the direction back toward the first optical interface filter 42. Wavelengths forwarded by both the second and first suppression filters along the optical fiber span 229 are directed to the second amplifying portion 202 of the C-band optical amplifier 77, via fiber connectors shown generally at 234.

In this embodiment, the suppression filters 230 and 232 are configured to attenuate the wavelength subsets 231 and 233, while forwarding other wavelengths with negligible attenuation. Due to the narrowness of the respective attenuation bands of the suppression filters 230 and 232, which in this embodiment attenuate only the 6 nm wide wavelength subset 231 of the OSC-band 54 and the 6 nm wide wavelength subset 233 of the L-band 58 respectively, the spectral responses of the suppression filters 230 and 232 are much more steeply-sloped at the boundaries of the wavelength subsets 231 and 233 than would be possible for filters configured to attenuate wider wavelength ranges. Accordingly, unlike broader-band attenuation filters, the suppression filters 230 and 232 of the present embodiment do not appreciably inadvertently attenuate the shorter or longer wavelength portions of the desired C-band 56 respectively, even in the present embodiment where the deadbands 55 and 57 surrounding the C-band 56 are narrower than those used in conventional systems.

In the present embodiment, the first suppression filter 230 includes a fiber Bragg grating, having negligible out-of-band attenuation characteristics. As the first suppression filter 230 is being used to attenuate wavelengths shorter than the desired C-band 56 rather than longer than the desired band, a fiber Bragg grating may be used for this purpose without introducing cladding mode ripple in the desired C-band itself. As noted in connection with the L-band optical amplifier 71, a fiber Bragg grating is preferable to a dielectric filter for attenuating undesired wavelengths shorter than the wavelengths of the desired communications band, as the transmission characteristics of a fiber Bragg grating may be configured to reduce undesirable effects, such as group delay ripple or insertions loss ripple for example, in the desired communications band. Alternatively, however, other types of suppression filters may be substituted.

Conversely, in this embodiment the second suppression filter 232 includes a dielectric interference filter, to avoid cladding mode loss effects that would tend to arise from use of a fiber Bragg grating to filter the wavelength subset 233. More particularly, in this embodiment the dielectric interference filter is configured to attenuate the wavelength subset 233 by transmitting it along the optical fiber span 228 to be discarded, while forwarding the C-band 56 by reflecting it with negligible attenuation along the optical fiber span 227. Alternatively, however, other suitable filter types may be substituted.

Amplified suppression-filtered C-band signals are then further amplified by the second amplifying portion 202 in a manner similar to the amplification provided by the first amplifying portion 200. Twice-amplified, suppression-filtered C-band signals are then provided via an optical fiber span 236 to the C-band port 100 of the second optical interface filter 48 shown in FIG. 3.

Once again, by providing the suppression filtering portion 204 at a mid-stage of the C-band optical amplifier 77, between the first and second amplifying portions 200 and 202, disadvantageous increases in noise and/or decreases in output power efficiency which would arise from providing additional filtering either prior to or after the C-band optical amplifier 77 are avoided.

Operation

S-band Amplification

Referring to FIGS. 3, 4, 5, 6 and 7, an exemplary optical amplification method according to the present embodiment of the invention is carried out when optical signals propagating in the optical fiber 44 arrive at the first optical interface filter 42 shown in FIG. 3. In this embodiment, the arriving optical signals include signals in the S-band 52, the OSC-band 54, the C-band 56, the L-band 58, and the OTDR-band 60 shown in FIG. 4. Alternatively, however, other spectral distributions of optical signals may be substituted if desired.

Referring to FIGS. 3, 4 and 5, in this embodiment, upon arrival at the first optical interface filter 42, the arriving signals propagate through the optical fiber 44 to the first individual interface filter 62, which separates a desired communications band from at least one other communications band. More particularly, in this embodiment the desired communications band corresponding to the first individual interface filter 62 is the S-band 52, and the at least one other communications band includes the OSC-band 54. In addition, in the present embodiment the first individual interface filter 62 separates the desired communications band from further communications bands, including the C-band 56, the L-band 58 and the OTDR-band 60. In this embodiment the first individual interface filter 62 achieves this by transmitting the S-band 52 along the optical fiber span 64 to the S-band optical amplifier 65, and by reflecting other wavelengths along the optical fiber span 66 to the second individual interface filter 68.

However, due to the non-ideal response of the first individual interface filter 62, at least some signals at wavelengths outside the S-band 52 will be inadvertently transmitted by the first individual interface filter 62, most appreciably at wavelengths close to the boundaries of the S-band 52. In the present embodiment the arriving optical signals do not include signals at wavelengths shorter than the S-band 52 and do not include signals in the first deadband 53. Accordingly therefore, in the present embodiment the inadvertently transmitted signals are appreciably present only at wavelengths in the OSC-band 54 nearest the S-band 52, or more particularly, in the wavelength subset 141 of the OSC-band 54.

Thus, still referring to FIGS. 3, 4 and 5, in this embodiment, signals transmitted by the first individual interface filter 62, including the S-band 52 and the inadvertently transmitted wavelength subset 141 of the OSC-band 54, propagate on the optical fiber span 64 to the S-band optical amplifier 65 shown in FIG. 5.

In this embodiment the S-band optical amplifier 65 amplifies the desired communications band while attenuating a wavelength subset of the at least one other communications band nearest the desired communications band and narrower than the at least one other communications band. More particularly, in this embodiment, the S-band optical amplifier 65 amplifies the desired S-band 52 while attenuating the wavelength subset 141 of the OSC-band 54.

More particularly still, in this embodiment, to amplify the signals arriving at the S-band optical amplifier 65, including the S-band 52 and the inadvertently transmitted wavelength subset 141 of the OSC-band 54, such signals are first propagated along the optical fiber span 64 to the multiplexer 126, which wavelength-division multiplexes the arriving signals with excitation wavelengths produced by the pump source 130, onto the photon multiplying portion 134, which in this embodiment includes the thulium-doped optical fiber span 135. The multiplexer 128 also directs additional excitation wavelengths produced by the pump source 132 onto the photon multiplying portion 134. In the present embodiment, the excitation wavelengths excite thulium ions in the thulium-doped optical fiber span 135 to their metastable states at higher energy levels than their ground state. The arrival of the optical signals including the S-band 52 and the inadvertently transmitted wavelength subset 141, results in stimulated emission by the excited ions, of photons at the same wavelengths as the S-band 52 and the wavelength subset 141, thereby increasing the number of photons at all wavelengths of the arriving signals, effectively amplifying the arriving signals.

In this embodiment, to attenuate the wavelength subset, the amplified S-band 52 and wavelength subset 141 signals then propagate through the multiplexer 128 and the optical isolator 136, and along the optical fiber span 137 to the suppression filter 140. As discussed earlier herein, in this embodiment the suppression filter 140 includes a dielectric interference filter, and is configured to attenuate the wavelength subset 141 while forwarding other wavelengths with negligible attenuation. As noted, in the present embodiment such negligible out-of-band attenuation is facilitated by the narrow bandwidth of the wavelength subset 141 which the suppression filter 140 is configured to attenuate, which allows the suppression filter to have a steeply-sloped spectral response profile. Thus, in the present embodiment, the suppression filter 140 transmits the S-band 52, and attenuates the only other wavelength band in which there is any appreciable signal strength, namely, the wavelength subset 141 of the OSC-band 54. Thus, only the S-band 52 is amplified and forwarded beyond the suppression filtering portion 124, and therefore, inter-band cross-talk effects, such as coherent interference when the amplified S-band 52 is recombined with other communications bands 50 for example, are effectively prevented or minimized. Moreover, due to its negligible out-of-band attenuation, the suppression filter 140 does not inadvertently cause any appreciable attenuation of the longer-wavelength regions of the S-band 52 itself, even in the present embodiment where the first deadband 53 between the S-band 52 and the OSC-band 54 is considerably narrower than conventional deadbands, or in other words, where the S-band 52 and OSC-band 54 are closer together. Thus, in the present embodiment the width of the deadband 53 is reduced, thereby reducing wasted communications bandwidth, without causing either unacceptable interband cross-talk or inadvertent attenuation of the desired S-band 52.

Referring to FIGS. 4 and 5, in this embodiment, wavelength subset 141 signals attenuated by the suppression filter 140 are transmitted along the optical fiber span 138, effectively discarding such signals.

Conversely, referring to FIGS. 3 and 5, in this embodiment, amplified and suppression-filtered S-band 52 optical signals forwarded (in this embodiment, reflected) by the suppression filter 140 are propagated through the fiber connectors 142 to the first multiplexer 144 of the second amplifying portion 122. The second amplifying portion 122 then further amplifies the suppression-filtered S-band 52 optical signals in the same manner as the first amplifying portion 120. As noted, by providing the suppression filtering at a mid-stage of the S-band optical amplifier 65, between the first and second amplifying portions 120 and 122, insertion loss effects that would tend to arise by providing such filtering at the first optical interface filter 42 prior to amplification are avoided, as are power usage inefficiencies that would tend to arise from providing such amplification at the second optical interface filter 48 after amplification.

Referring to FIGS. 3 and 5, the suppression-filtered and twice-amplified S-band 52 optical signals are propagated on the optical fiber span 154 to the second optical interface filter 48 via the S-band port 112 thereof, to the tenth individual interface filter 110. The tenth individual interface filter 110 transmits such signals onto the optical fiber span 114, which exits the second optical interface filter 48 at the common port 116 thereof. The tenth individual interface filter 110 also reflects optical signals in other communications bands received along the optical fiber span 108 onto the optical fiber span 114, effectively recombining the S-band 52 with such other communications bands, which in this embodiment include the OSC-band 54, the C-band 56, the L-band 58 and the OTDR-band 60. The suppression-filtered and twice-amplified S-band 52 optical signals, along with the other communications bands, are then propagated to the next node or device (not shown) of an optical network (not shown) in which the optical amplification system 40 operates.

L-band Amplification

Referring to FIGS. 3, 4 and 6, amplification and suppression-filtering of the L-band 58 proceed in a somewhat analogous manner. Optical signals in the OSC-band 54, the C-band 56, the L-band 58 and the OTDR-band 60 are reflected by the first individual interface filter 62 to the second individual interface filter 68, which separates a desired communications band from at least one other communications band.

More particularly, in this embodiment the at least one other communications band includes a first other communications band of longer wavelengths than the desired communications band, and a second other communications band of shorter wavelengths than the desired communications band. More particularly still, in this embodiment the desired communications band corresponding to the second individual interface filter 68 is the L-band 58, the first other communications band is the OTDR-band 60, and the second other communications band is the C-band 56.

Thus, in the present embodiment separating the desired communications band from the at least one other communications band involves separating the desired communications band from the first other and second other communications bands. In this embodiment the second individual interface filter 68 is configured to separate these communications bands, and also separates the desired communications band from further communications bands, including the OSC-band 54. In the present embodiment the second individual interface filter 68 achieves this by transmitting the L-band 58 along the optical fiber span 70 to the L-band optical amplifier 71, and by reflecting other wavelengths along the optical fiber span 72 to the third individual interface filter 74.

Once again, due to the non-ideal response of the second individual interface filter 68, at least some signals at wavelengths outside the L-band 58 will be inadvertently transmitted by the second individual interface filter 68, most appreciably at wavelengths close to the boundaries of the L-band 58. More particularly, in the present embodiment the arriving optical signals do not include any signals in the deadbands 57 or 59 surrounding the L-band 58, and accordingly, in this embodiment the inadvertently transmitted signals are appreciably present only at wavelengths in the OTDR-band 60 and in the C-band 56 nearest the L-band 58. More particularly still, in this embodiment the inadvertently transmitted signals are appreciably present only in the wavelength subset 191 of the OTDR-band 60 and in the wavelength subset 193 of the C-band 56 respectively.

Thus, still referring to FIGS. 3, 4 and 6, in this embodiment, signals transmitted by the first individual interface filter 62, including the L-band 58 and the inadvertently transmitted wavelength subsets 191 and 193 of the OTDR-band 60 and the C-band 56 respectively, propagate on the optical fiber span 70 to the L-band optical amplifier 71 shown in FIG. 6.

In this embodiment the L-band optical amplifier 71 amplifies the desired communications band while attenuating a wavelength subset of the at least one other communications band nearest the desired communications band and narrower than the at least one other communications band. More particularly, in this embodiment the L-band optical amplifier 71 amplifies the desired L-band 58, and includes the first suppression filter 190 which is configured to attenuate the wavelength subset 191 of the first other communications band nearest the desired communications band and narrower than the first other communications band, and also includes the second suppression filter 192 which is configured to attenuate the wavelength subset 193 of the second other communications band nearest the desired communications band and narrower than the second other communications band.

Referring to FIGS. 4, 5 and 6, in this embodiment, to amplify the signals arriving at the L-band optical amplifier 71, including the L-band 58 and the inadvertently transmitted wavelength subsets 191 and 193, such signals are first propagated along the optical fiber span 70 to the multiplexer 166, which wavelength-division multiplexes the arriving signals with excitation wavelengths produced by the pump source 170, onto the photon multiplying portion 174. The multiplexer 168 also directs additional excitation wavelengths produced by the pump source 172 onto the photon multiplying portion 174. The photon multiplying portion 174 increases the number of photons at all wavelengths of the arriving signals, effectively amplifying the arriving signals, as described above in connection with the S-band optical amplifier 65.

Referring to FIGS. 4 and 6, in this embodiment, attenuation of the wavelength subsets 191 and 193 involves propagation of the amplified L-band 58, wavelength subset 191 and wavelength subset 193 signals through the multiplexer 168 and the optical isolator 185, and along the optical fiber span 186 to the first suppression filter 190. As discussed earlier herein, in this embodiment the first suppression filter 190 includes a dielectric interference filter, and is configured to attenuate the wavelength subset 191 while forwarding other wavelengths with negligible attenuation. Similarly, in this embodiment the second suppression filter 192 includes a fiber Bragg grating, and is configured to attenuate the wavelength subset 193 while forwarding other wavelengths with negligible attenuation.

As noted, in the present embodiment such negligible out-of-band attenuation is facilitated by the narrow bandwidths of the wavelength subsets 191 and 193 which the suppression filters 190 and 192 are respectively configured to attenuate, which allow the suppression filters to have steeply-sloped spectral response profiles. Thus, in the present embodiment, the suppression filtering portion 164 forwards or transmits the L-band 58, and attenuates the only other wavelength bands in which there is any appreciable signal strength, namely, the wavelength subset 191 of the OTDR-band 60 and the wavelength subset 193 of the C-band 56. Thus, only the L-band 58 is amplified and forwarded or transmitted beyond the suppression filtering portion 164, and therefore, interband cross-talk effects, such as coherent interference when the amplified L-band 58 is recombined with other communications bands 50 for example, are effectively prevented or minimized. Moreover, due to their negligible out-of-band attenuation characteristics, the suppression filters 190 and 192 do not inadvertently cause any appreciable attenuation of the longer-wavelength or shorter-wavelength regions of the L-band 58 respectively, even in the present embodiment where the deadbands 57 and 59 between the L-band 58 and the surrounding C-band and OTDR-band are considerably narrower than conventional deadbands. Thus, in the present embodiment the widths of the deadbands 57 and 59 are reduced, thereby reducing wasted communications bandwidth, without causing either unacceptable inter-band cross-talk or inadvertent attenuation of the desired L-band 58.

Referring to FIGS. 4 and 6, in this embodiment, wavelength subset 191 signals attenuated by the first suppression filter 190 are transmitted along the optical fiber span 188, effectively discarding such signals. Similarly, wavelength subset 193 signals attenuated by the second suppression filter 192 are reflected back along the optical fiber span 187 to first suppression filter 190, which in turn reflects such signals back along the optical fiber span 186 to the optical isolator 185, which discards any electromagnetic radiation travelling back toward the first amplifying portion 160 of the L-band optical amplifier 71.

Amplified and suppression-filtered L-band 58 optical signals forwarded along the optical fiber span 189 by the suppression filtering portion 164 are propagated through the fiber connectors 194 to the first multiplexer 176 of the second amplifying portion 162. The second amplifying portion 162 then further amplifies the suppression-filtered L-band 58 optical signals in the same manner as the first amplifying portion 160. Advantages of mid-stage suppression filtering, as discussed in connection with the S-band optical amplifier, are thus achieved.

Referring to FIGS. 3 and 6, the suppression-filtered and twice-amplified L-band 58 optical signals are propagated on the optical fiber span 196 to the second optical interface filter 48 via the L-band port 106 thereof, to the ninth individual interface filter 104. The ninth individual interface filter 104 transmits such signals onto the optical fiber span 108 to the tenth individual interface filter 110, for subsequent recombination with the S-band 52 and propagation therefrom to the next network node or device (not shown) along the optical fiber span 114, as described above in connection with the operation of the tenth individual interface filter 110. The ninth individual interface filter 104 also reflects optical signals in other communications bands received along the optical fiber span 102 onto the optical fiber span 108, effectively recombining the L-band 58 with such other communications bands, which in this embodiment include the OSC-band 54, the C-band 56 and the OTDR-band 60.

C-band Amplification

Referring to FIGS. 3, 4 and 7, amplification and suppression-filtering of the C-band 56 proceed analogously to such amplification and filtering of the L-band 58. The second individual interface filter reflects optical signals in the OSC-band 54, the C-band 56 and the OTDR-band 60, and also inadvertently reflects a comparably small proportion of the L-band 58, to the third individual interface filter 74, which separates a desired communications band from at least one other communications band. More particularly, in this embodiment the desired communications band corresponding to the third individual interface filter 74 is the C-band 56, and the at least one other communications band includes the OSC-band 54 and the L-band 58. In addition, in the present embodiment the third individual interface filter 74 also separates the desired communications band from the OTDR-band 60. In this embodiment the third individual interface filter 74 achieves this by transmitting the C-band 56 along the optical fiber span 76 to the C-band optical amplifier 77, and by reflecting other wavelengths along the optical fiber span 78 to the fourth individual interface filter 80.

However, due to the non-ideal response of the third individual interface filter 74, at least some signals at wavelengths outside the C-band 56 will be inadvertently transmitted by the third individual interface filter 74, most appreciably at wavelengths close to the boundaries of the C-band 56. In the present embodiment the arriving optical signals do not include signals at wavelengths in the deadbands 55 or 57 surrounding the C-band 56, and accordingly, in the present embodiment the inadvertently transmitted signals are appreciably present only at wavelengths in the OSC-band 54 and in the L-band 58 nearest the C-band 56, or more particularly, in the wavelength subsets 231 and 233 of the OSC-band 54 and of the L-band 58 respectively.

Thus, still referring to FIGS. 3, 4 and 7, in this embodiment, signals transmitted by the third individual interface filter 74, including the C-band 56 and the inadvertently transmitted wavelength subsets 231 and 233 of the OSC-band 54 and the L-band 58 respectively, propagate on the optical fiber span 76 to the C-band optical amplifier 77 shown in FIG. 7.

In this embodiment the C-band optical amplifier 77 amplifies the desired communications band while attenuating a wavelength subset of the at least one other communications band nearest the desired communications band and narrower than the at least one other communications band. More particularly, in this embodiment, the C-band optical amplifier 77 amplifies the desired C-band 56 while attenuating the wavelength subsets 231 and 233 of the OSC-band 54 and the L-band 58 respectively.

Referring to FIGS. 3, 4, 6 and 7, initial amplification of the signals arriving at the C-band optical amplifier 77, including the C-band 56 and the inadvertently transmitted wavelength subsets 231 and 233, is carried out by the first amplifying portion 200 in the same manner as the amplification provided by the first amplifying portion 160 of the L-band optical amplifier 71 shown in FIG. 6, as described above, except that the power levels of the pump sources 210 and 212 of the first amplifying portion 200 of the C-band optical amplifier may differ from those of the pump sources 170 and 172 of the L-band optical amplifier, as the power levels of the pump sources 210 and 212 are set based upon the expected signal strength of the C-band 56 signals as they arrive at the first amplifying portion 200, and upon the desired output signal strength of the first amplifying portion 200.

In this embodiment, attenuation of the wavelength subsets 231 and 233 involves propagation of the amplified C-band 56, wavelength subset 231 and wavelength subset 233 signals through the multiplexer 208 and the optical isolator 225, and along the optical fiber span 226 to the second suppression filter 232. As discussed earlier herein, in this embodiment the second suppression filter 232 includes a dielectric interference filter configured to attenuate the wavelength subset 233 while forwarding other wavelengths with negligible attenuation. Similarly, in this embodiment the first suppression filter 230 includes a fiber Bragg grating which is configured to attenuate the wavelength subset 231 while forwarding other wavelengths with negligible attenuation.

As noted, in the present embodiment such negligible out-of-band attenuation is facilitated by the narrow bandwidths of the wavelength subsets 231 and 233 which the suppression filters 230 and 232 are respectively configured to attenuate, which allow the suppression filters to have steeply-sloped spectral response profiles. Thus, in the present embodiment, the suppression filtering portion 204 forwards the C-band 56, and attenuates the only other wavelength bands in which there is any appreciable signal strength, namely, the wavelength subsets 231 and 233 of the OSC-band 54 and the L-band 58 respectively. Thus, only the C-band 56 is amplified and forwarded beyond the suppression filtering portion 204, and therefore, inter-band cross-talk effects, such as coherent interference when the amplified C-band 56 is recombined with other communications bands 50 for example, are effectively prevented or minimized. Moreover, due to their negligible out-of-band attenuation, the suppression filters 230 and 232 do not inadvertently cause any appreciable attenuation of the shorter- or longer-wavelength regions of the C-band 56 itself, even in the present embodiment where the deadbands 55 and 57 surrounding the C-band 56 are considerably narrower than conventional deadbands. Thus, in the present embodiment the widths of the deadbands 55 and 57 are reduced, thereby reducing wasted communications bandwidth, without causing either unacceptable inter-band cross-talk or inadvertent attenuation of the desired C-band 56.

Referring to FIGS. 4 and 7, in this embodiment, wavelength subset 233 signals attenuated by the second suppression filters 232 are transmitted along the optical fiber span 228, effectively discarding such signals. Similarly, wavelength subset 231 signals attenuated by the first suppression filter 230 are reflected back along the optical fiber span 227 to the second suppression filter 232, which in turn reflects such signals back along the optical fiber span 226 to the optical isolator 225, which discards any electromagnetic radiation travelling back toward the first amplifying portion 200 of the C-band optical amplifier 77.

Conversely, referring to FIGS. 3, 5 and 7, in this embodiment, amplified and suppression-filtered C-band 56 optical signals forwarded by the suppression filters 230 and 232 along the optical fiber span 229 are propagated through the fiber connectors 234 to the second amplifying portion 202, which then further amplifies the suppression-filtered C-band 56 optical signals in the same manner as the first amplifying portion 200. Advantages associated with mid-stage suppression filtering, as described earlier herein, are thus achieved.

Referring to FIGS. 3 and 7, the suppression-filtered and twice-amplified C-band 56 optical signals are propagated on the optical fiber span 236 to the second optical interface filter 48 via the C-band port 100 thereof, to the eighth individual interface filter 98. The eighth individual interface filter 98 transmits such signals onto the optical fiber span 102 to the ninth individual interface filter 104, for subsequent recombination with the L-band 58, recombination with the S-band 52 at the tenth individual interface filter 110, and further propagation therefrom, as described above. The eighth individual interface filter 98 also reflects optical signals in other communications bands received along the optical fiber span 96 onto the optical fiber span 102, effectively recombining the C-band 56 with such other communications bands, which in this embodiment include the OSC-band 54 and the OTDR-band 60.

OSC-band and OTDR-band

Referring back to FIG. 3, in this embodiment, the first optical interface filter 42 drops off an optical service channel after separating the desired communications bands from other communications bands. More particularly, in this embodiment, optical signals in the OSC-band 54 and the OTDR-band 60 are reflected by the third individual interface filter 74 to the fourth individual interface filter 80, which transmits the OSC-band 54 on the optical fiber span 82 and reflects the OTDR-band 60 to the fifth individual interface filter 84. The transmitted OSC-band 54 propagates on the optical fiber span 82 out of the first optical interface filter 42 via the OSC-band port 81, for receipt by optical service equipment (not shown) at the location of the optical amplification system 40.

The OTDR-band 60 signals reflected by the fourth individual interface filter 80 are received at the fifth individual interface filter 84, which transmits such signals on the optical fiber span 87. The transmitted OTDR-band 60 propagates on the optical fiber span 87 out of the first optical interface filter 42 via the OTDR-band port 85, for receipt by an optical time domain reflectometer (not shown) at the location of the optical amplification system 40.

Recombination

In this embodiment, at the second optical interface filter 48, OTDR-band 60 signals are received via the OTDR-band port 89 from the optical time domain reflectometer (not shown) on the optical fiber span 88. The sixth individual interface filter 86 transmits such signals along the optical fiber span 90 to the seventh individual interface filter 92.

The seventh individual interface filter 92 receives OSC-band 54 signals via the OSC-band port 95 from the optical service equipment (not shown) on the optical fiber span 94. The seventh individual interface filter 92 transmits such signals along the optical fiber span 96 to the eighth individual interface filter 98, and also reflects the OTDR-band 60 signals received on the optical fiber span 90 along the optical fiber span 96 to the eighth individual interface filter 98. At the eighth, ninth and tenth individual interface filters 98, 104 and 110, these signals are successively recombined with the amplified and suppression-filtered C-band 56, L-band 58 and S-band 52 signals respectively, and all such signals are then propagated on the optical fiber span 114 via the common port 116, to the next network node or device (not shown), as described above.

Alternatives

Raman System

Figure 8:
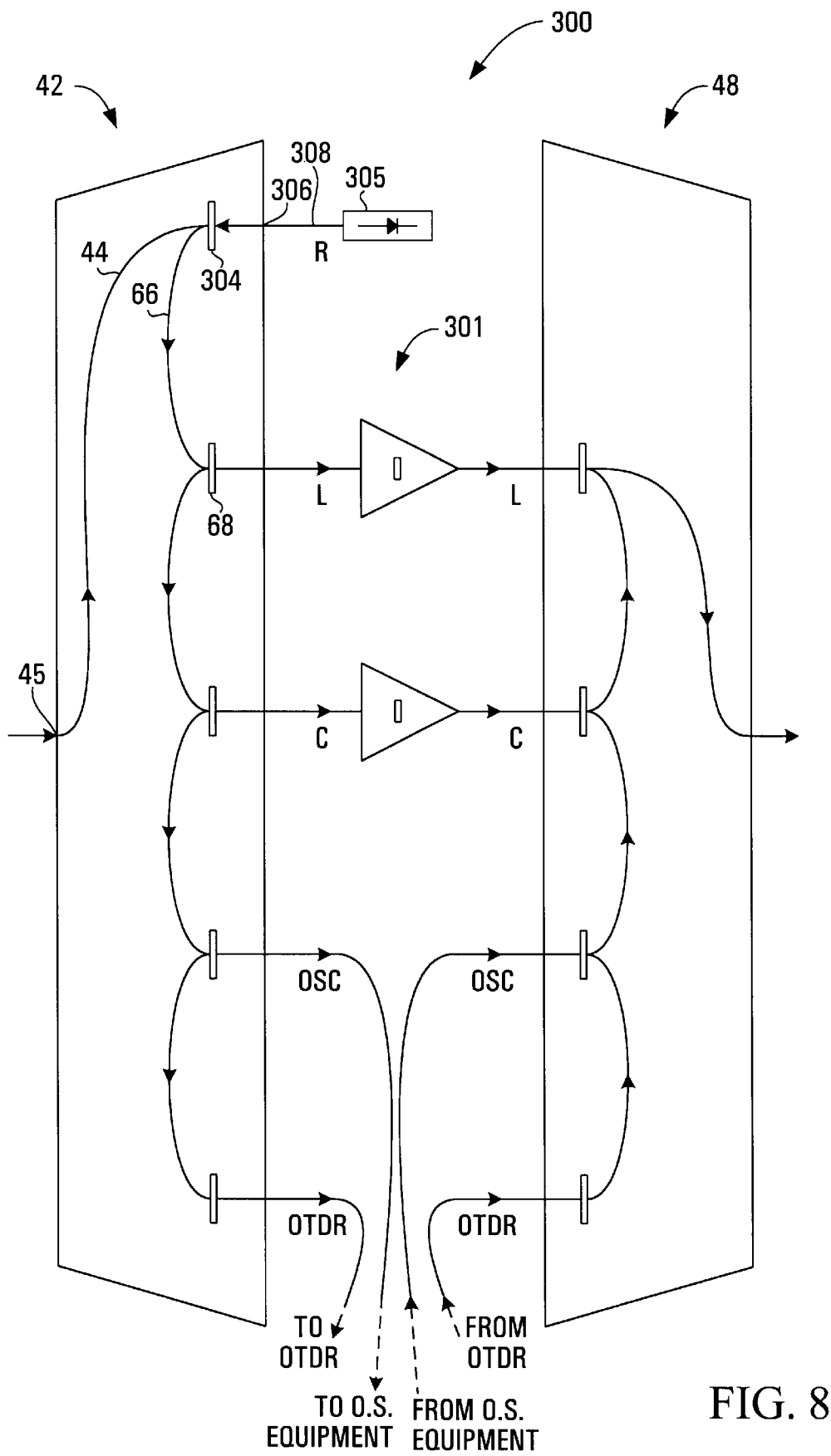
FIG. 8 is a representation of an optical amplification system, according to a third embodiment of the invention.

Referring to FIGS. 3, 4 and 8, an optical amplification system according to a third embodiment of the invention is shown generally at 300 in FIG. 8. In this embodiment, distributed Raman amplification is used to supplement the signal amplification provided by amplifiers shown generally at 301, in order to significantly increase the minimum distance between successive regenerative optical amplification systems such as that shown at 300.

In this embodiment, the S-band 52 shown in FIG. 4 is not used, and a Raman pump wavelengths band or "Raman-band" 302, which in this embodiment ranges from 1420.0 to 1512.0 nm, has been substituted therefor. Thus, in the present embodiment only two primary communications bands, namely, the C-band 56 and the L-band 58, are received, along with the OSC-band 54 and the OTDR-band 60, at the first optical interface filter 42 on the optical fiber 44 shown in FIG. 8.

Referring to FIGS. 3 and 8, in this embodiment the S-band optical amplifier 65 shown in FIG. 3 has been removed, and the first individual interface filter 62 shown in FIG. 3 has been replaced with a Raman interface filter 304 shown in FIG. 8. The Raman interface filter 304 is configured to reflect all wavelengths received on the optical fiber 44 along the optical fiber span 66 to the second individual interface filter 68. The Raman interface filter 304 also receives Raman-band 302 signals, from a Raman pump source 305 via a Raman-band port 306 on an optical fiber span 308. The Raman interface filter is configured to transmit such Raman-band signals onto the optical fiber 44 in a direction opposite to the direction of the incoming communications bands 54, 56, 58 and 60. The Raman-band signals serve to induce stimulated Raman scattering in the optical fiber 44, effectively transforming the optical fiber 44 itself into an amplifier. More particularly, the Raman-band 302 signals coherently modulate charge polarization in the medium of the optical fiber 44, or in other words, the Raman-band signals coherently drive Si—O bond vibrational modes in the optical fiber 44, thereby transferring energy to such vibrational modes. In response to the communications bands 54, 56, 58 and 60, energy is transferred from the vibrational modes to the communications bands, effectively amplifying the C-band 56, L-band 58, OSC-band 54 and OTDR-band 60 signals travelling therethrough.

Thus, the addition of distributed Raman amplification allows successive regenerative amplification systems, which may include the optical amplification system 300 for example, to be placed further apart than conventional erbium-doped or thulium-doped fiber amplifiers.

Apart from the foregoing differences, in the present embodiment the optical amplification system 300 shown in FIG. 8 is similar to the optical amplification system 40 shown in FIG. 3, although alternatively, numerous substitutions, additions, deletions or other modifications may be apparent to one of ordinary skill in the art upon reviewing this specification. For example, other communications bands may be substituted. As a further example, a Raman pump source may be provided at a transmission point (not shown) upstream of the first optical interface filter 42, either in addition to or as a substitute for the Raman pump source 305, for providing Raman pump wavelengths that are codirectional with the communications bands 50.

Amplifiers

Referring back to FIGS. 3, 5, 6 and 7, although the second and third embodiments above have been described as including both thulium-doped and erbium-doped fiber amplifiers, alternatively, other types of amplifiers may be substituted if desired. For example, rare-earth doped waveguide amplifiers, bulk free space amplification systems, other types of rare-earth doped amplifiers, semiconductor optical amplifiers, or Raman amplification systems using either co-directional or counter-directional pump sources or both, may be substituted for any of the amplifying portions 120, 122, 160, 162, 200 and 202 shown in FIGS. 5, 6 and 7.

In addition, although the suppression filters have been described as filtering only the respective wavelength subsets, in addition, the suppression filters may also filter some or all of the deadbands interposed between the desired communication band and the other adjacent communications bands if desired. However, such filtration is generally unnecessary, and widening the attenuation range of the suppression filters may disadvantageously diminish the steepness of the slope of the spectral response of the suppression filters, potentially reducing the negligibility of the out-of-band attenuation of the suppression filters.

Communications Bands

If desired, other communications bands or other deadbands therebetween may be substituted for those shown in FIG. 4. For example, referring back to FIG. 4, if desired, an ultra-wide S-band, such as a wavelength band ranging from 1450 nm to 1524 nm for example, may be substituted for the S-band 52, subject to availability of a suitable optical amplifier (not part of this invention), which may include a hybrid Raman/rare-earth doped amplifier for example, with adequate gain over such a broad wavelength range. In such a case, the OSC-band 54 may be shifted to another wavelength range, such as the wavelength range presently occupied by the OTDR-band 60 for example, in which case the OTDR-band may be omitted or shifted to another wavelength range, such as a shorter-wavelength range than the ultra-wide S-band for example, if desired.

In addition, although the system shown in FIG. 3 described unidirectional communications bands 50, alternatively, if desired, one or more of the communications bands 50 may be travelling in a direction opposite to one or more others of the communications bands 50.

Similarly, although 3-band and 2-band systems have been described above, alternatively, any number N of communications bands may be substituted.

Figure 9:
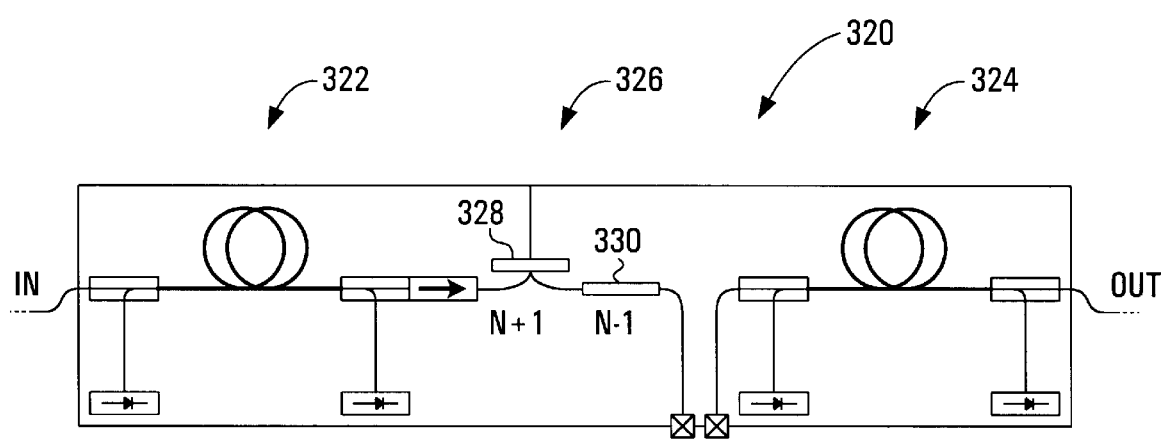
FIG. 9 is a schematic representation of an optical amplifier according to a fourth embodiment of the invention.

For example, referring to FIGS. 3 and 9, an optical amplifier according to a fourth embodiment of the invention is shown generally at 320 in FIG. 9. The optical amplifier 320 includes first and second amplifying portions 322 and 324, and a suppression-filtering portion 326 interposed therebetween. In this embodiment the optical amplifier 320 is in communication with an optical interface filter (not shown) analogous to that shown at 42 in FIG. 3, which is configured to separate a desired communications band from a first other communications band of longer wavelengths than the desired communications band and a second other communications band of shorter wavelengths than the desired communications band. The optical amplifier 320 amplifies the desired communications band, and includes a first suppression filter 328 configured to attenuate a wavelength subset of the first other communications band nearest the desired communications band and narrower than the first other communications band, and further includes a second suppression filter 330 configured to attenuate a wavelength subset of the second other communications band nearest the desired communications band and narrower than the second other communications band. The first suppression filter 328 preferably includes a dielectric interference filter, while the second suppression filter 330 preferably includes a fiber Bragg grating, although alternatively, other types of suppression filters may be substituted.

Accordingly, if desired, an amplification system similar to that shown in FIG. 3 may be provided in which N optical amplifiers similar to that shown in FIG. 9 are provided. Each of the N optical amplifiers may include respective first and second suppression filters for filtering wavelength subsets of other communications bands adjacent the desired communications band, although alternatively, for the $1^{st}$ band, the $N^{th}$ band, and for any intermediate desired bands in respect of which at least one of the adjacent other bands has already been redirected for separate amplification (depending on the precise cascade of individual interface filters used), one of the first and second suppression filters may be omitted if such omission would not result in unacceptable inter-band cross-talk for the particular application at hand.

Interface Filters

Advantageously, in the embodiment shown in FIG. 3, as the individual interface filters 62, 68 and 74 are detached from the respective optical amplifiers 65, 71 and 77, so that amplification of the respective communications bands effectively occurs in parallel rather than in series, it is possible to drop off the OSC-band 54 after the S-band 52, the C-band 56 and the L-band 58 have been directed along their respective amplification paths, as shown in FIG. 3. Thus, in the embodiment shown in FIG. 3 it is possible to establish inter-site communications via the OSC-band 54 even if one or more of the amplifiers 65, 71 and 77 have not yet been placed into operation. In contrast, in alternative systems in which interface filters are integral with their respective amplifiers, effectively involving a cascade of successive amplifiers rather than a cascade of successive interface filters, it would not be feasible to have inter-site communication via the OSC-band 54 if any of the amplifiers was not operational, unless the OSC-band 54 is separated from the other various communications bands upstream of the cascade of amplifiers, which undesirably tends to introduce an additional insertion loss into the remaining communications bands. Alternatively, however, if desired, the interface filters may be integral with their respective amplifiers, which despite the foregoing disadvantage would tend to achieve at least some of the advantages of the embodiments described herein.

More generally, while specific embodiments of the invention have been described and illustrated, such embodiments should be considered illustrative of the invention only and not as limiting the invention as construed in accordance with the accompanying claims.

What is claimed is:

1. An optical amplification system comprising:
an optical interface filter configured to separate a desired communications band from at least two other communications bands, wherein said at least two other communications bands comprise a first other communications band of longer wavelengths than said desired communications band and a second other communications band of shorter wavelengths than said desired communications band, and wherein said interface filter is configured to separate said desired communications band from said first other and said second other communications bands; and
an optical amplifier in communication with said interface filter for amplifying said desired communications band, said optical amplifier comprising at least one suppression filter configured to attenuate a wavelength subset of one of said at least two other communications bands nearest said desired communications band and narrower than said one of said at least two other communications bands.

2. The system of claim 1 wherein said at least one suppression filter is configured to attenuate said wavelength subset while forwarding other wavelengths with negligible attenuation.

3. The system of claim 1 wherein said at least one suppression filter is configured to attenuate, as said subset, a wavelength range an order of magnitude narrower than said one of said at least two other communications bands.

4. The system of claim 1 wherein said amplifier further comprises an isolator configured to discard wavelengths attenuated by said at least one suppression filter.

5. The system of claim 1 wherein said interface filter is configured to drop off an optical service channel after separating said desired communicating band from said one of said at least two other communications bands.

6. The system of claims 1 wherein said at least one suppression filter comprises:
a first suppression filter configured to attenuate a wavelength subset of said first other communications band nearest said desired communications band and narrower than said first other communications band; and a second suppression filter configured to attenuate a wavelength subset of said second other communications band nearest said desired communications band and narrower than said second other communications band.

7. The system of claim 6 wherein said first suppression filter comprises a dielectric interference filter.

8. An optical amplification system comprising:
means for separating a desired communications band from at least two other communications bands, wherein said at least two other communications bands comprise a first other communications band of longer wavelengths than said desired communications band and a second other communications band of shorter wavelengths than said desired communications band, and wherein said means for separating comprises means for separating said desired communications band from said first other and said second other communications bands; and means for amplifying said desired communications band, said means for amplifying comprising means for attenuating a wavelength subset of one of said at least two other communications bands nearest said desired communications band and narrower than said one of said at least two other communications bands.

9. The system of claim 8 wherein said means for attenuating comprises means for attenuating said wavelength subset while forwarding other wavelengths with negligible attenuation.

10. The system of claim 8 wherein said means for attenuating comprises means for attenuating, as said subset, a wavelength range an order of magnitude narrower than said one of said at least two other communications bands.

11. The system of claim 8 further comprising means for discarding wavelengths attenuated by said means for attenuating.

12. The system of claim 8 wherein said means for separating comprises means for dropping off an optical service channel after separating said desired communications band from said one of said at least two other communications bands.

13. The system of claim 8 wherein said means for attenuating comprises:
means for attenuating a wavelength subset of said first other communications band nearest said desired communications band and narrower than said first other communications band; and means for attenuating a wavelength subset of said second other communications band nearest said desired communications band and narrower than said second other communications band.

14. The system of claim 13 wherein said means for attenuating said wavelength subset of said first other communications band comprises a dielectric interference filter.

15. An optical amplification method comprising:
separating a desired communications band from at least two other communications bands, wherein said at least two other communications bands comprise a first other communications band of longer wavelengths than said desired communications band and a second other communications band of shorter wavelengths than said desired communications band, and wherein separating comprises separating said desired communications band from said first other and said second other communications bands; and amplifying said desired communications band while attenuating a wavelength subset of one of said at least two other communications bands nearest said desired communications band and narrower than said one of said at least two other communications bands.

16. The method of claim 15 wherein attenuating comprises attenuating said wavelength subset while forwarding other wavelengths with negligible attenuation.

17. The method of claim 15 wherein attenuating comprises attenuating, as said subset, a wavelength range an order of magnitude narrower than said one of said at least two other communications bands.

18. The method of claim 15 further comprising discarding wavelengths attenuated by said at least one suppression filter.

19. The method of claim 15 further comprising dropping off an optical service channel after separating said desired communications band form said one of said at least two other communications bands.

20. The method of claims 15 wherein attenuating comprises:

attenuating a wavelength subset of said first other communications band nearest said desired communications band and narrower than said first other communications band; and attenuating a wavelength subset of said second other communications band nearest said desired communications band and narrower than said second other communications band.

21. The method of claim 20 wherein attenuating said subset of said first other communications band comprises attenuating said subset with a dielectric interference filter.

22. An optical amplification system comprising:

an optical interface filter configured to separate a desired communications band from at least one other communications band; and an optical amplifier in communication with said interface filter for amplifying said desired communications band, said optical amplifier comprising at least one suppression filter configured to attenuate a wavelength subset of said at least one other communications band nearest said desired communications band and narrower than said at least one other communications band, wherein said at least one suppression filter comprises a dielectric interference filter.

23. An optical amplification system comprising:

means for separating a desired communications band from at least one other communications band; and means for amplifying said desired communications band, said means for amplifying comprising means for attenuating a wavelength subset of said at least one other communications band nearest said desired communications band and narrower than said at lest one other communications band, wherein said means for attenuating comprises a dielectric interference filter.

24. An optical amplification method comprising:

separating a desired communications band from at least one other communications band; and amplifying said desired communications band while attenuating a wavelength subset of said at least one other communications band nearest said desired communications band and narrower than said at least one other communications band, wherein attenuating comprises reflecting said subset at a dielectric interference filter.

* * * * *